(12) United States Patent
Kagehiro et al.

(10) Patent No.: US 6,246,794 B1
(45) Date of Patent: Jun. 12, 2001

(54) METHOD OF READING CHARACTERS AND METHOD OF READING POSTAL ADDRESSES

(75) Inventors: Tatsuhiko Kagehiro, Kokubunji; Masashi Koga, Hachioji; Hiroshi Sako, Shiki; Hiromichi Fujisawa, Tokorozawa; Hisao Ogata, Kokubunji; Yoshihiro Shima, Tokorozawa; Shigeru Watanabe, Owari-Asahi; Masato Teramoto, Nagoya, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/763,515

(22) Filed: Dec. 11, 1996

(30) Foreign Application Priority Data

Dec. 13, 1995 (JP) .................................................. 7-324516
Jan. 8, 1996 (JP) .................................................. 8-000438

(51) Int. Cl.[7] .................................................. G06K 9/18

(52) U.S. Cl. ........................... 382/185; 382/101; 382/177; 382/229; 382/286

(58) Field of Search .................................. 382/101, 102, 382/177, 178, 185, 186, 229, 230, 231, 286

(56) References Cited

U.S. PATENT DOCUMENTS

| | | | | |
|---|---|---|---|---|
| 4,811,412 | * | 3/1989 | Katsurada | 382/185 |
| 5,020,117 | * | 5/1991 | Ooi et al. | 382/185 |
| 5,161,245 | * | 11/1992 | Fenwick | 382/177 |
| 5,497,432 | * | 3/1996 | Nishida | 382/229 |
| 5,544,259 | * | 8/1996 | McCubbrey | 382/177 |

OTHER PUBLICATIONS

H. Fujisawa et al., "An Augmented Segmentation, Algorithm for Connected Handwritten Numerals", Proceedings of 1984 Institute IEIC Fall Conference, pp. 6–141.

E. Ishidera et al., "A Segmentation Method of Address Recognition", Proceedings of 1995 Institute IEIC Spring Conference, D–576, p. 302.

H. Murase et al., "Segmentation and Recognition of Hand--Written Character String Using Linguistic Information", Transaction of Institute of Electronics, Information and Communication Engineers (D) J69–D, No. 9, pp. 1292–1300 (not dated).

K. Ooi, "A Method to Recognize the Street Number Portion of an Address", Tech. Report of IECE PRU 92–40, pp. 39–46 (not dated).

(List continued on next page.)

Primary Examiner—Phuoc Tran
(74) Attorney, Agent, or Firm—Antonelli, Terry, Stout & Kraus, LLP

(57) ABSTRACT

A character reading method has enhanced character segmentation accuracy and character string recognition accuracy for reading correctly hand-written addresses on postal matters. The method extracts provisional character patterns from image information of the address character string (step 206), creates a table 219 of tentative character patterns and implements the character classification for the tentative character patterns (step 207), extracts, specifically for characters of the street number portion of the address character string, periphery information (vertical and horizontal lengths, vertical/horizontal length ratio, pattern spacings, etc.) of tentative character patterns (step 212), and segments the character string into characters accurately based on the information (step 215).

13 Claims, 30 Drawing Sheets

OTHER PUBLICATIONS

H. Murase et al., "Online Writing–Box Free Character String Recognition by Candidate Character Lattice Method", Transaction of the Institute of Electronics, Information and Communication Engineers (D) J68–D, No. 4, pp. 765–772 (not dated).

N. Babaguchi et al., "A Fundamental Study on Character Segmentation from Handwritten Japanese Character Strings", The Transaction of the Institute of Electronics, Information and Communication Engineers (D) J68–D, No. 6, pp. 2123–2131 (not dated).

* cited by examiner

FIG. 20

| DESCRIPTION OF PATTERN FEATURE 2001 | LEFTHAND BOUNDARY 2002 | RIGHTHAND BOUNDARY 2003 | CANDIDATE CHARACTER CODE 2004 | | SIMILARITY 2005 | | CREDIBILITY 2006 |
|---|---|---|---|---|---|---|---|
| 中 | 0 | 1 | 中 | 小 | 0.8 | 0.7 | 0.6 |
| 中亻 | 0 | 2 | 外 | 外 | 0.4 | 0.2 | 0.0 |
| 中亻主 | 0 | 3 | 則 | | 0.3 | 0.0 | 0.0 |
| 亻 | 1 | 2 | 亻 | 1 | 0.4 | 0.3 | 0.0 |
| 主 | 1 | 3 | 住 | 注 | 0.9 | 0.6 | 0.5 |

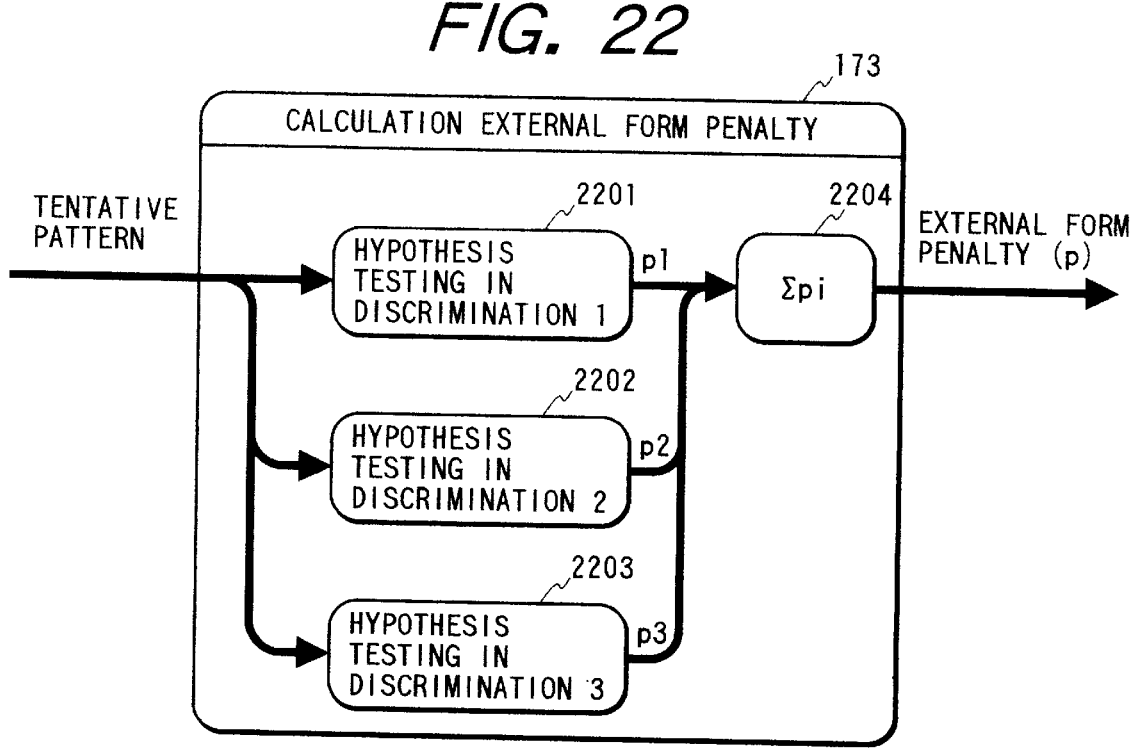

FIG. 23
| NAME | CONTENTS | |
|---|---|---|
| E1 |  | PARTING ( LEFT ) |
| E2 |  | PARTING ( RIGHT ) |
| E3 |  | TAKE IN ( LEFT ) |
| E4 | 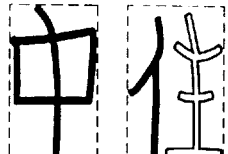 | TAKE IN ( RIGHT ) |
| E5 |  | PARTING ( INSIDE ) |
| E6 | 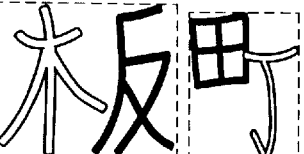 | SWELL |
| E7 |  | STICK |

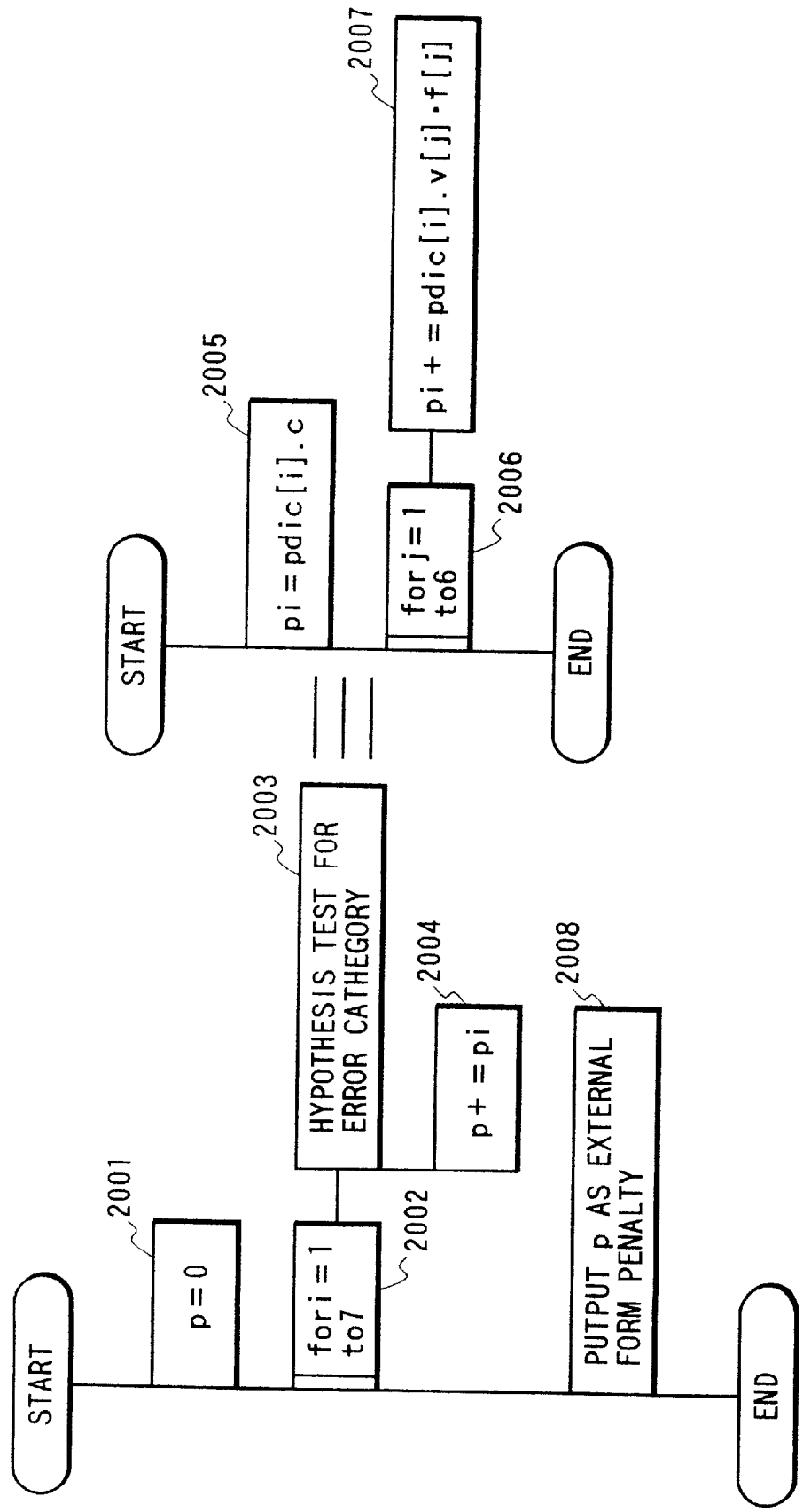

METHOD OF READING CHARACTERS AND METHOD OF READING POSTAL ADDRESSES

BACKGROUND OF THE INVENTION

1. Field of the Invention

The present invention relates to a method of reading characters, and more particularly to a method of reading character strings, particularly hand-written character strings including Kanji characters of postal addresses written on the surface of mail pieces.

2. Description of the Prior Art

For the automatic reading of a character string of postal address written on the surface of a mail piece or the like, the image of the mail surface is first converted into an electrical signal, and then the region where the character string is written is detected. Subsequently, based on the video signal of the detected region, characters of the character string are classified. Each character of the character string is classified by the following procedure.

(1) Image patterns which deem to be characters of a character string are extracted by segmentation:(character segmentation).

(2) Character species (character codes) of the segmented character patterns are classified:(character classification).

(3) A character string formed by connecting the classified character species is compared with character strings of postal addresses or the like registered in a table (character string dictionary) thereby to recognize the character string as a certain address or the like: (character string matching).

Among the above-mentioned processes, the character segmentation of item (1) is most difficult due to a variety of cases of written surfaces including hand-written characters, characters of Kanji in which one character can be made up of multiple other characters, and character strings written in either a vertical or horizontal form, as will be explained later in connection with FIG. 1 and FIG. 34A.

In regard to the conventional scheme of character segmentation for a character string read out of a written surface, the over segmentation approach is known to be effective. In the over segmentation approach, the image signal of a character string is separated into multiple character patterns having the possibility as characters, each separated character pattern is classified in terms of character (character species), and the character patterns are determined to be correct based on the similarity of the classified character species of character pattern and the comparison of the string of character species with character strings in a reference dictionary.

As a specific example of the prior art regarding the over segmentation approach, there has been proposed the scheme of the testing of recognition-candidate characters based on character classification by Fujimawa, et al. (described in The Proceeding of The 1984 Institute IEIC Fall Conference "An Augmented Segmentation Algorithm for Connected Hand-written Numerals").

Another scheme of the testing of recognition-candidate character patterns based on the shape of characters has been proposed by Ishidera, et al. (described in The Proceeding of The 1995 Institute IEIC Spring Conference D-576 "A Segmentation Method of Address Recognition").

Schemes of the testing of the assumption based on character classification and character string comparison have been proposed by Murase, et al. (described in The Transaction of the Institute of Electronics, Information and Communication Engineers, (D) Vol.J69-D, No.9 "Segmentation and Recognition of Hand-written Character String Using Linguistic Information"), and by ooi (described in the TECHNICAL REPORT OF IECE PRU 92-40 "A Method to Recognize the Street Number Portion of an Address").

A scheme of the assessment of correctness of character segmentation based on the character width, character pitch and character spacing is described in The Transaction of the Institute of Electronics, Information and Communication Engineers, REPORT OF IECE (D) J68-D, No.12, pp.2123–2131. Also known is a scheme of the assessment of correctness of character segmentation based on the character pattern and information on the similarity of character species as described in The Transaction of the Institute of Electronics, Information and Communication Engineers, REPORT OF IECE (D) J68-D, No.4, pp.765–772.

However, the above-mentioned prior art schemes of over segmentation approach encounter the difficulty of correct character segmentation, as will be shown for some examples in the following.

In FIG. 1 showing a postal address 101 hand-written on a mail piece, a street number portion 102 is visually recognized to be Kanji-numerals " 三-二- ——▲ ". In this case, a character reading apparatus based on the above-mentioned over segmentation approach implements the character pattern segmentation for the region 102 at boundaries shown by the dashed lines. Namely, the vertical and horizontal lengths and vertical/horizontal length ratio of character patterns vary significantly depending on individual character species, and therefore it is difficult to select a correct character string out of six possible cases 103.

Figures 33A, 33B:
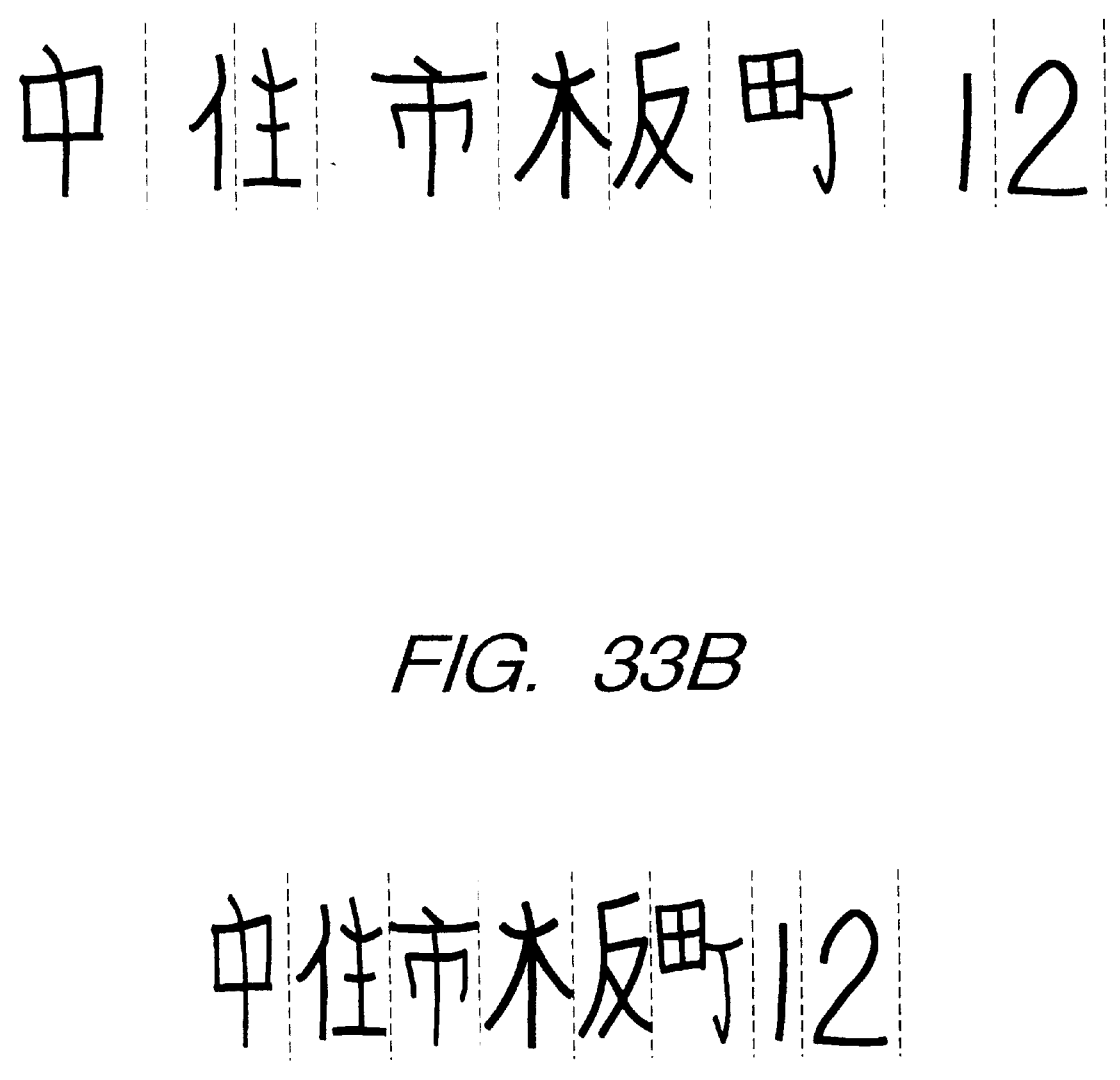

FIG. 33A shows a hand-written character string with large character spacings. This character string is segmented at boundaries shown by the dashed lines, resulting in recognition-candidate character patterns as shown in FIG. 34A. In the figure, the relationship of the candidate patterns is expressed graphically in terms of nodes that represent boundaries of character patterns and arcs that represent character patterns, and it is called a "segmentation hypothesis network".

Correct segmentation of character patterns based on the above-mentioned over segmentation approach is carried out by the process of finding the optimal path from the starting node ⓪ to the ending node ⑨ on the segmentation hypothesis network. The character patterns represented by the arcs in FIG. 34A are classified in terms of their character species. In this case any of " 木 ", " 反 ", and " 板 " indicates a high similarity, and therefore it is difficult for the prior art schemes to segment the character string.

Among the above-mentioned prior art schemes, the one proposed by Fujisawa, et al. and the one proposed by Ishidera, et al. is designed to judge the legitimacy of each character pattern, but it does not use the relation with neighboring character patterns, and the ones proposed by Ooi and Murase use the relation with neighboring character patterns for the matching of character strings, but these schemes do not use information of the relative feature values of neighboring characters such as the spacings.

SUMMARY OF THE INVENTION

Accordingly, it is a primary object of the present invention to accomplish a character reading method based on the determination of correct character patterns from a string of segmented character patterns and the accurate classification of the character patterns.

Another object of the present invention is to accomplish a method of accurate reading of characters of postal address from the video signal of an address character string which consists of a town name portion and street number portion written on the mail surface.

Still another object of the present invention is to accomplish, for the reading of address character string based on the over segmentation approach, a method of accurate character pattern segmentation by use of the relative feature values of the pattern in attention and neighboring patterns for an address character string for which candidate character patterns segmented cannot be tested correctly based solely on character classification and character string matching.

In order to achieve the above objectives, the inventive character reading method comprises:

a first step of combining connected components (e.g., strokes formed of consecutive black pixels) in a character string to be classified which has been imaged electronically by means of an image input device thereby to segment the character string into character patterns having the possibility as characters (a segmented character pattern which is not yet classified will be called "tentative character pattern" hereinafter);

a second step of implementing the character classification for the tentative character patterns by making reference to a character classification dictionary thereby to obtain subordinate information (recognition-candidate characters and similarity of tentative character patterns and recognition-candidate characters) for the tentative character patterns;

a third step of obtaining border information for the tentative character patterns;

a fourth step of obtaining the credibility of the border information of the tentative character patterns obtained in the third step by making reference to a segmentation dictionary which contains border information by use of the recognition-candidate characters obtained in the second step as the key, and applying weights to the tentative character patterns;

a fifth step of determining the character segmentation in accordance with the weights of the tentative character patterns; and a sixth step of implementing the word-wise matching by use of the character classification dictionary for a set of classified character species produced from the tentative character patterns determined in the fifth step, and identifying the characters of the character string.

In the case of using this character reading method to read a character string of postal address which consists of a town name portion and street number portion, the image of the character string is converted into an electrical signal, the character string region is extracted from the electrical image information, and the connected components of the character string segmented in the above-mentioned first step are combined thereby to produce several tentative character patterns.

Each of the tentative character patterns undergoes the character classification by use of the character classification dictionary thereby to obtain information of candidate characters that resemble the tentative character patterns. The town name portion of address is read by use of the information of candidate characters and by making reference to a town name dictionary, and the head position of the street number portion is detected. The town name dictionary contains all town names existing.

Upon detecting the head position of the street number portion, the border information of the tentative character patterns of the street number is obtained, and the credibility of the border information is obtained by making reference to the character segmentation dictionary. Character segmentation of the tentative character patterns for the characters of the street number portion is implemented again in consideration of the credibility, and the characters of the street number portion is identified by using the information of candidate characters that resemble the resulting tentative character patterns and by making reference to the street number dictionary. The street number dictionary contains all character information of street numbers existing.

According to another preferred form of this invention, the border information of the above-mentioned third step is the external form penalty which is based on the relative feature values of each tentative character pattern with respect to neighboring character patterns at the occurrence of each conceivable type of error for the assessment of the legitimacy of the assumption that each tentative character pattern segmented has resulted from incorrect segmentation of the error type.

As described above, the inventive character reading method is based on the scheme of character string segmentation in which the similarity obtained by character classification reflects on the character segmentation and the scheme of integrated border information of tentative character patterns of the character pattern so that both schemes complement each other, whereby a character string even having irregular character widths, character pitches, and character spacings can be segmented accurately for character classification based on the optimal use of effective information.

In dealing with the problem of the difficulty of character segmentation for a hand-written character string based on the assumed values of the character width, character pitch and character spacing common to all characters, the inventive method compares the feature values of character patterns by making reference to the character segmentation dictionary which is prepared for the testing of the assumption of character segmentation, thereby evaluating the credibility which reflects on the character segmentation. The character segmentation dictionary contains the likelihood distribution as the credibility of pattern with respect to the feature values. Although the calculation of credibility requires a lot of manpower, time and experience-based knowledge, the inventive method enables the evaluation of the credibility of the optimal weighting for each character species by merely displaying tentative character segmentations on the screen so that the operator merely selects a correct tentative character segmentation.

BRIEF DESCRIPTION OF THE DRAWINGS

FIG. 20 is a table showing the structure of the pattern table which contains arcs of the segmentation hypothesis network;

FIG. 21 is a table showing the structure of the node table which contains nodes of the segmentation hypothesis network;

FIG. 22 is a flowchart showing the calculation process of the external form penalty;

FIG. 23 is a table showing the types of segmentation error;

FIG. 32 is a flowchart showing the external form penalty calculation process;

FIG. 33A and 33B are diagrams showing examples of address character strings to be recognized.

DESCRIPTION OF THE PREFERRED EMBODIMENTS

Figure 1:
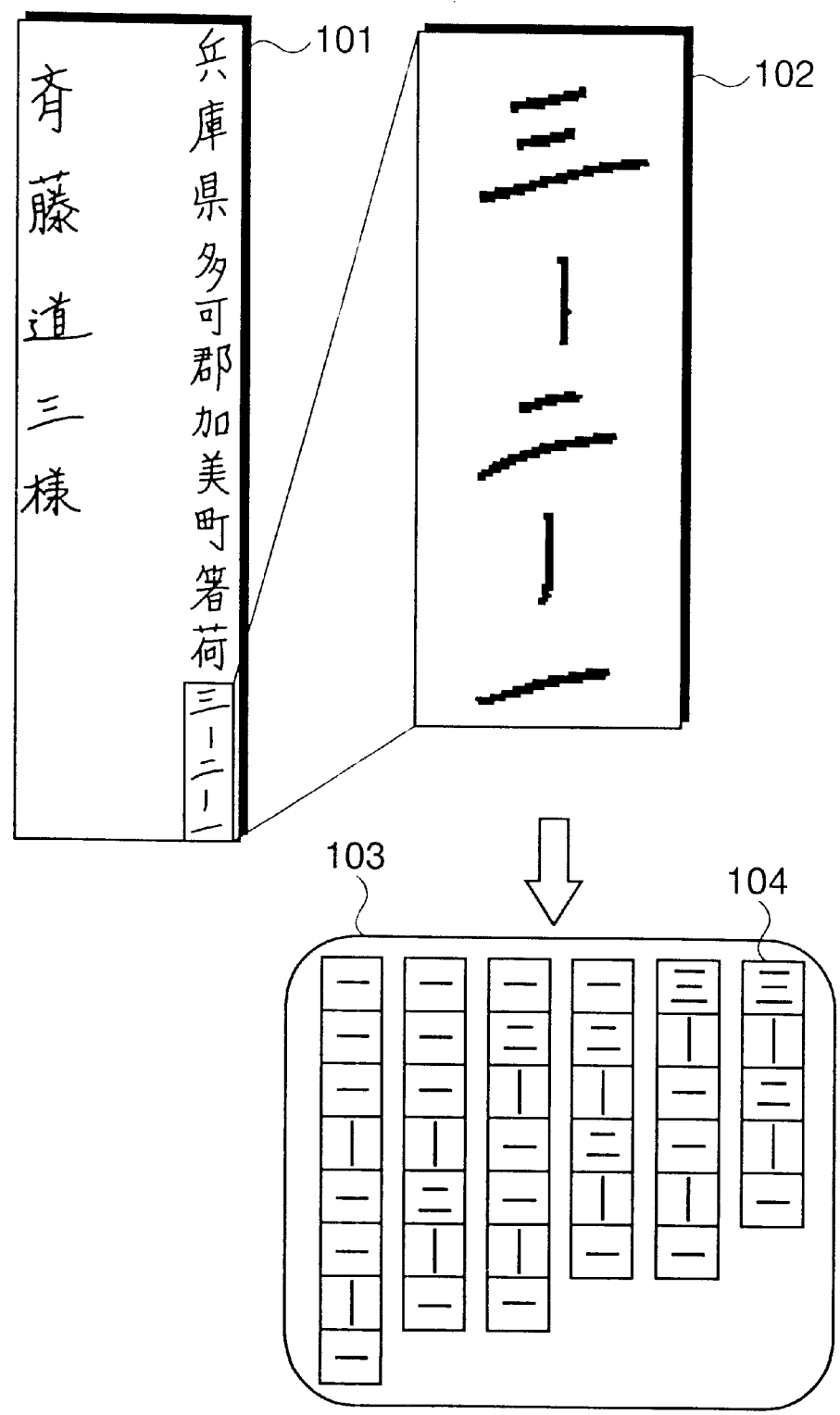
FIG. 1 is a diagram showing an example of the input image which invokes the ambiguity of character segmentation for the prior art schemes.
Figure 2:
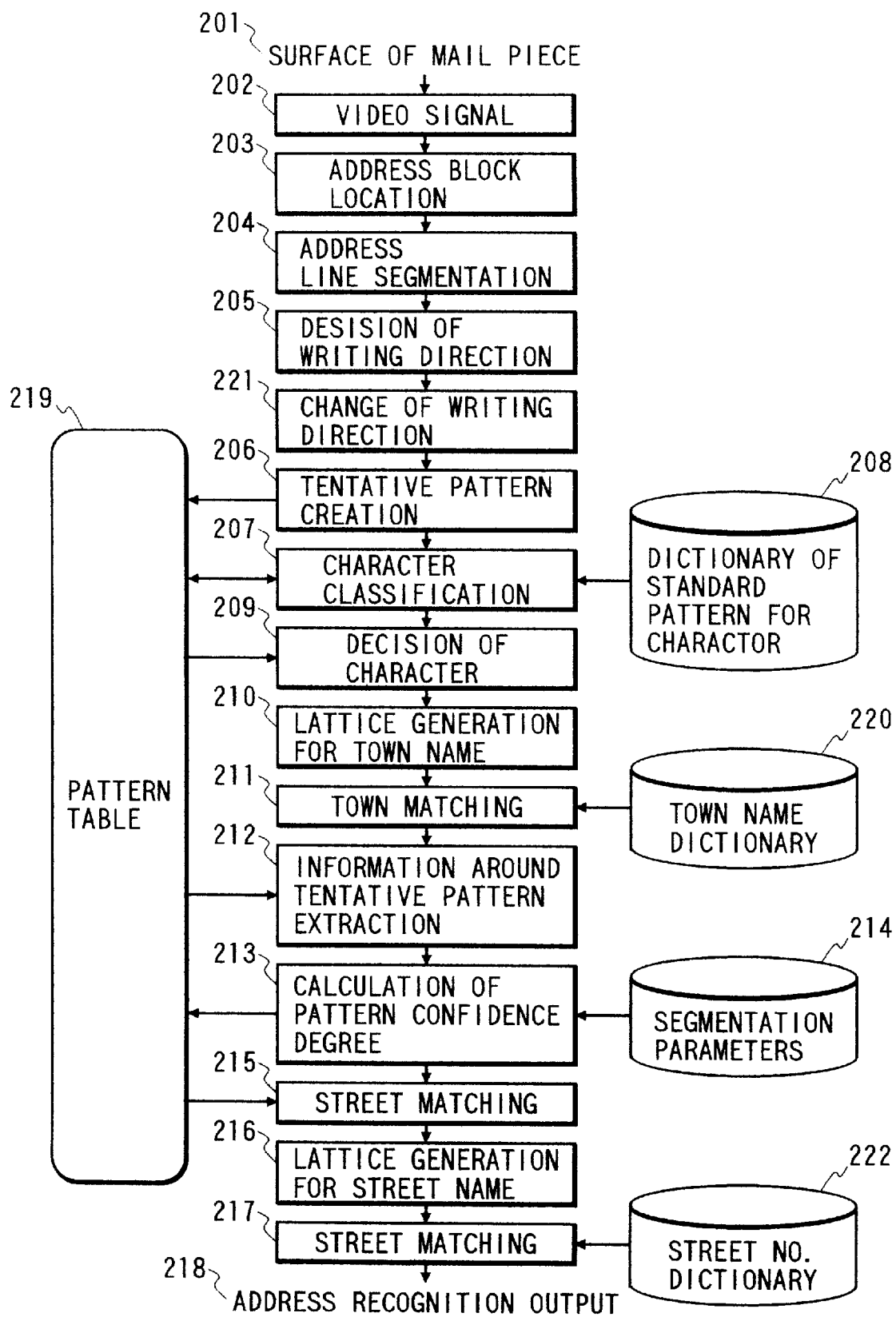
FIG. 2 is a flowchart showing the character reading method based on an embodiment of this invention.

FIG. 2 is a flowchart showing the character reading method based on an embodiment of this invention. This embodiment is applied to the automatic character reader for reading postal addresses written on the surface of mail pieces. The process of reading a character string of a postal address which consists of a town name and street number is carried out as follows.

The mail surface 201 is imaged with an imaging means (scanner) to form a video signal: (202), information of address block is extracted from the video signal: (203), and a character string is segmented based on the image information of the address block: (204).

The image information, with the character string being segmented, undergoes the discrimination of vertical form or horizontal form: (205), and the processing mode is switched according to the result: (221). These processes 201–221 are carried out based on the conventional scheme.

There have been practiced various methods with electronic apparatus of reading automatically character strings of prefecture names, city names, town names and so on written on mail pieces. For example, Japanese patent publication JP-A-Hei-2-64882 discloses the address recognition based on different character segmenting processes for one character string portion from the beginning to the town name and another character string portion of the street number. Japanese patent publication JP-A-Hei-5-151389 discloses a method of detecting the region of mail surface where the address is written based on the prior detection of the position of postal zip code.

Japanese Patent Publication No.60-41396 discloses a method of segmenting a character string in the address block based on the measurement of the height of a block pattern and detection of a character string having the same height. Japanese patent publication JP-A-Sho-63-18785 discloses a method of distinguishing the vertical or horizontal form (direction of a string of characters) of a segmented character string based on the evaluation of the horizontal length and vertical length of characters in the address block and the comparison of these lengths.

Subsequently, the process of segmenting the tentative character pattern at the position of the possible character formation proceeds by combining consecutive black pixels (i.e., stroke) within the character string of image information. This process of tentative character pattern segmentation will be called "tentative pattern generation" (206). Tentative character patterns may include improper patterns besides correct character patterns to be recognized. The segmented tentative character patterns are registered in the pattern table 219. The tentative character patterns and the pattern table 219 will be explained in detail later in connection with FIG. 6 and FIG. 7.

Each tentative character pattern registered in the pattern table 219 is subjected to character recognition based on a character classification dictionary 208:(207). In the character classifying process, several recognition-candidate characters that resemble each tentative character pattern, the similarity of the recognition candidate characters with the tentative character pattern, the position of tentative character pattern on the character string, information on the number of connected components consecutive block pixels, and attribute information of the tentative character patterns are obtained as border information. The recognition-candidate characters and border information are stored in correspondence to each tentative character pattern in the pattern table 219. A proper tentative character pattern for character segmentation is selected based on the pattern table 219 in which the recognition-candidate characters and border information have been stored: (209). A set of recognition-candidate characters, i.e., a string of recognition-candidate characters, is produced from the recognition-candidate characters corresponding to the character pattern selected at the determination of character segmentation:(210). Character species up to the low-order candidate character are registered for the recognition-candidate character string for each character pattern. This registered character species will be called "lattice".

Town matching for comparing the lattice with the town name dictionary 220 is carried out:(211), thereby producing a proper recognition character string for characters of town name of address. The town name dictionary 220 contains all town names existing. Reading of characters of the town name by the town matching process 211 completes, the last character of the character string of the town name is determined, and information of the head position of street number is obtained.

Upon obtaining the information of the head position of street number, information on the vertical and horizontal lengths, vertical/horizontal ratio, pattern spacing, number of connected components (called "pattern periphery information" or "information around tentative pattern") of the tentative character pattern is extracted: (212). The credibility of the extracted periphery information is calculated by use of the segmentation dictionary 214: (213). The calculated credibility is stored as the attribute of the corresponding tentative character pattern in the pattern table 219.

A tentative character pattern in the pattern table 219 is selected again based on the credibility to override the previous selection. Namely, the determination of character segmentation takes place to override the previous determination to have only the street number different from the tentative character pattern selected at the tentative pattern determination 209: (215). Following this recurrent character segmentation determination 215, a lattice is produced again based on the information: (216). Street matching is carried out for the newly produced lattice by used the street number dictionary 222: (217), and recognition of street number characters is carried out. The street number dictionary contains all characters for expressing any street number. The result is combined with the characters of town name which have been recognized by town matching (211), and the recognition of the entire address completes: (218).

Next, the details of the individual processes shown in FIG. 2 and the apparatus which carries out these processes will be explained. The processes from video signal input 202 up to vertical/horizontal mode switching 221 are the same as the prior art scheme, and the processes from tentative pattern generation 206 up to town matching 211 are the technique described in the above-mentioned publication of The Transaction of the Institute of Electronics, Information and Communication Engineers, (D) J68-D, No.4, pp.765–772.

Figure 3:
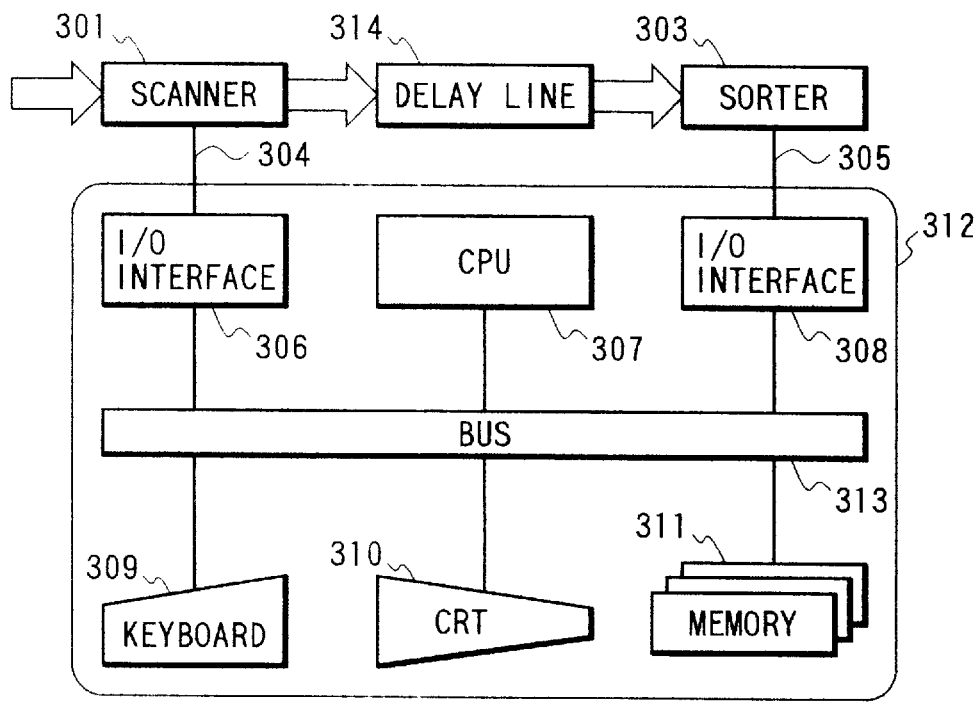
FIG. 3 is a block diagram of the character recognition apparatus which practices the inventive character reading method.

FIG. 3 shows the arrangement of the apparatus which carries out the address reading method described above. In the figure, the bored arrows indicate the flow of a mail piece. A video signal 202 is entered by means of a scanner 301. In order to make the time for reading the address, there is provided a delay line 314 on the mail piece conveyance path. The scanner 301 is connected by an input/output cable 304 to a character recognition apparatus 312, which is connected with a sorter 303 by another input/output cable 305.

The character recognition apparatus 312 has an internal bus 313 for connecting the internal devices, an I/O interface 306 for the communication with the scanner 301, an arithmetic processing device 307 which controls the overall apparatus 312 and implements the address recognition process, an I/O interface 308 for the communication with the sorter 303, a keyboard 309 used for the start-up operation and the like, a CRT unit 310 for displaying the state of processing, and a memory 311 for storing the tables, programs and dictionaries used for address recognition.

Figure 4:
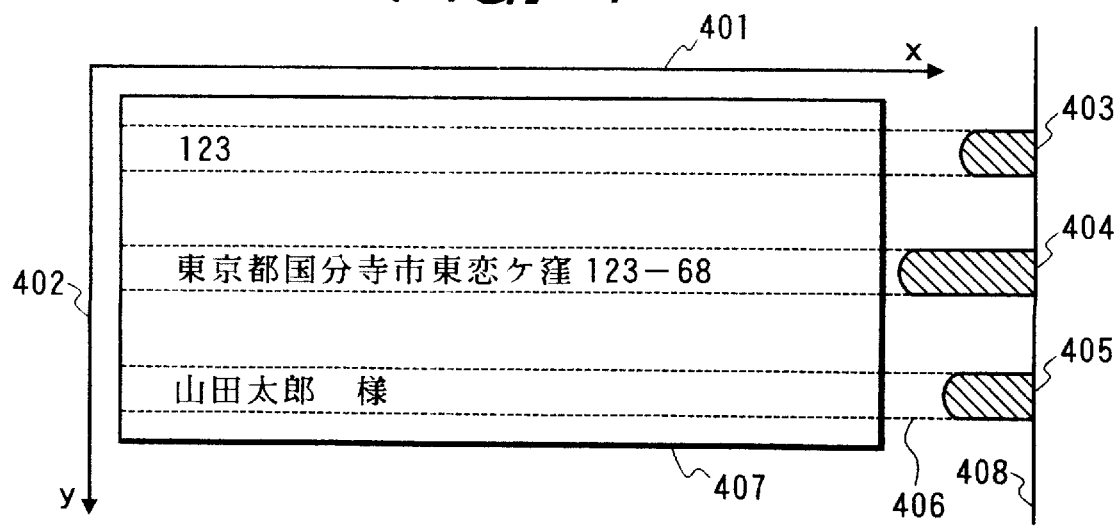
FIG. 4 is a diagram used to explain the character string extracting process 204 in FIG. 2.

FIG. 4 is a diagram explaining the processes from video signal input 202 up to character string extraction 204. Indicated by 407 is the image of the address block extracted from the video signal 202 by the address block locating process 203. Shown by 403, 404 and 405 are histograms drawn by projecting black pixels included in the address block 407 onto the axis 408 which is parallel to the y-axis 402. Based on the values of these histograms, the y-axis coordinates of the top and bottom of a character string, as shown by the dashed line 406, are evaluated, and the character string of address line is extracted: (204).

Figure 5:
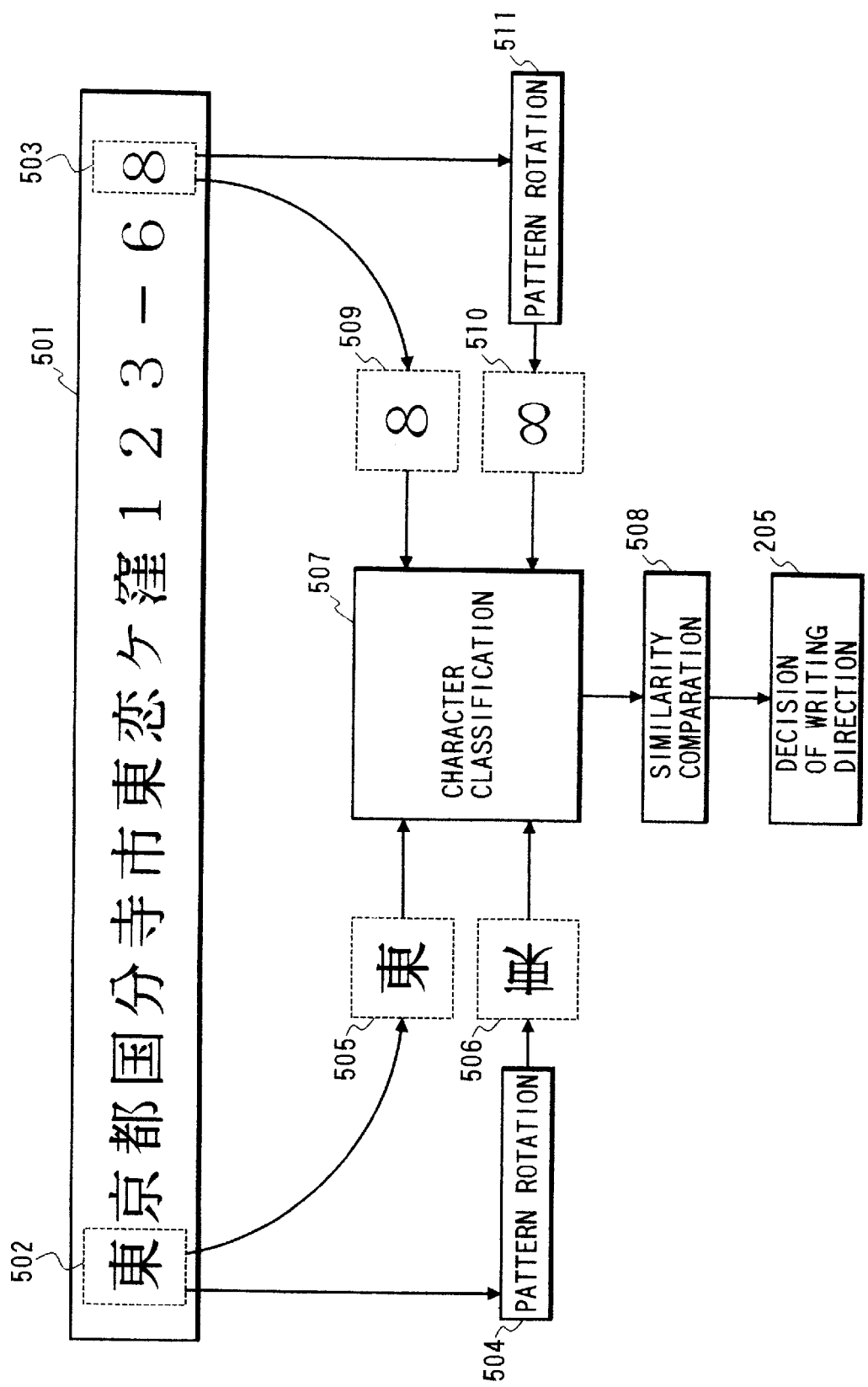
FIG. 5 is a diagram used to explain the vertical/horizontal form discrimination process 205 in FIG. 2.

FIG. 5 is a diagram explaining the vertical/horizontal form discrimination process 205. Shown by 501 is the image of a character string written in horizontal form. Indicated by 502 and 503 are character patterns of the starting character and ending character of the character string, and 505 and 509 are these character patterns extracted intact from the character string. Indicated by 506 and 510 are character patterns derived from the character patterns 502 and 503 but rotated by 90° by the pattern rotation processes 504 and 511. These character patterns are subjected to character classification: (507). The resulting values of similarity are compared: (508), and vertical/horizontal form discrimination or writing direction (205) is implemented based on the comparison result. The feature extraction process is switched between the vertical form and horizontal form based on the result: (221 of FIG. 2).

In contrast to the form discrimination by use of the layout information of the image, which often results in an erroneous judgment for an input image including an address character string that does not comply with the standard layout, this embodiment of invention which implements the form discrimination by use of character recognition itself performs the reliable vertical/horizontal form discrimination. In case there is little difference in the similarity between the first and last characters of the address character string and those rotated by 90°, characters neighboring the first and last characters are taken out and they undergo the same form judgment process. Namely, the vertical/ horizontal form discrimination is carried out by avoiding such Kanji characters as "田" and "山" that vary little in the similarity when rotated by 90°, but based on characters suitable for the judgment thereby, enhancing the accuracy of form discrimination.

Figure 6:
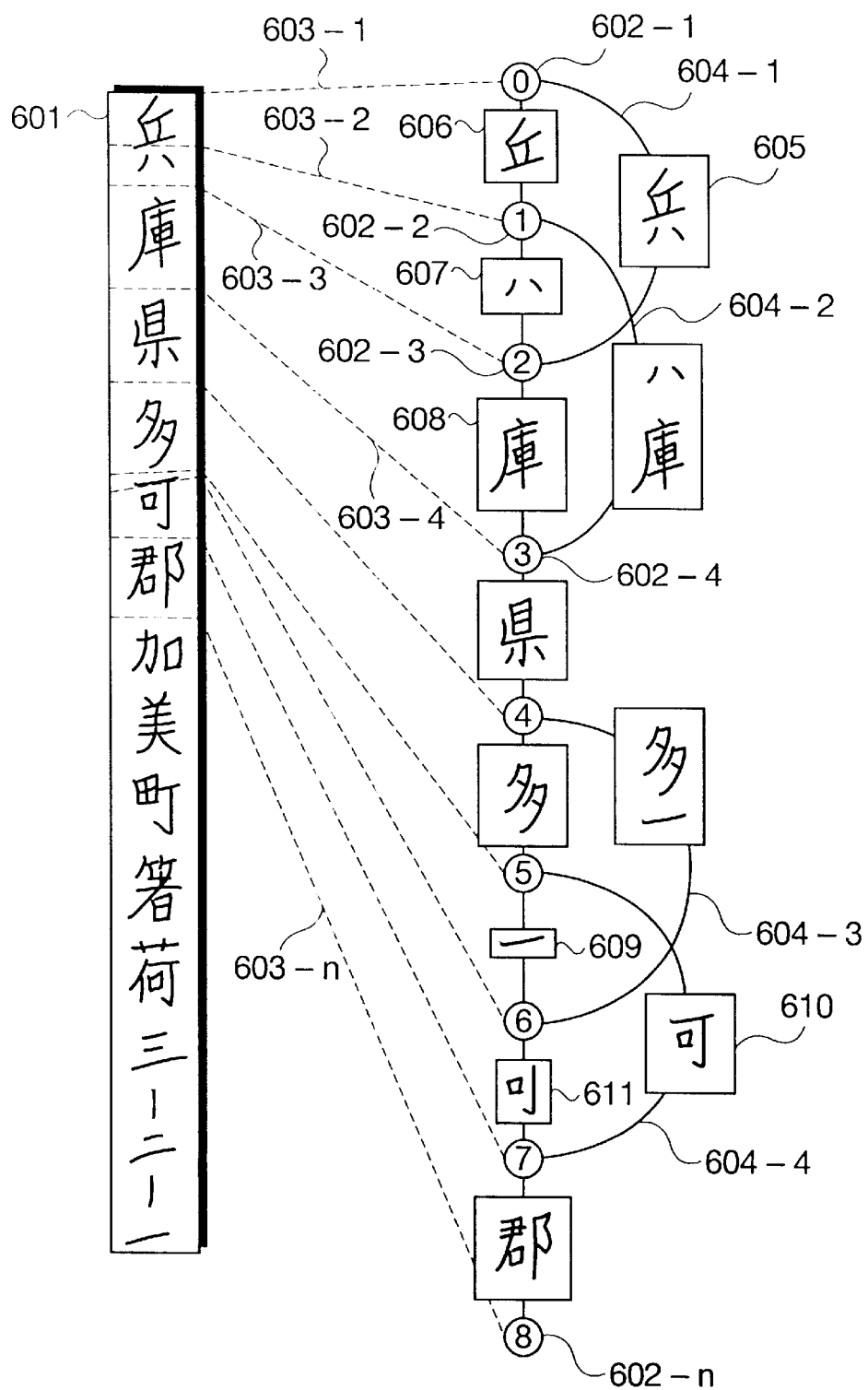
FIG. 6 is a diagram used to explain the tentative pattern generation process 206 of FIG. 2 in correspondence to an input image.

FIG. 6 is a diagram explaining the tentative character pattern in correspondence to the input image. For a handwritten address character string 601 to be recognized, the tentative pattern generation process 206 of FIG. 2 segments the character string of input image at character boundaries (indicated by dashed lines 603-i, where i=1,2, ..., n). The points numbered by 1 through 8 in circles and labeled by 603-i (where i=1,2, ..., n) are called "nodes". A curve 604 which connects two adjacent nodes is called an "arc", and patterns 605, 606, ..., 611 which correspond to these arcs 604 are tentative character patterns. Namely, shown on the right-hand side of the figure is a segmentation hypothesis network. For example, for character pattern "z,9 " to be recognized, there are possible tentative character patterns of "z,10 " 606 and " 八 " 607 in addition to the pattern "兵" 605. Similarly, for character pattern " 可", there are possible assumed divisional character patterns of "—" 609 and "口|" 611 in addition to the pattern " 可" 610. Each tentative character pattern exists between nodes connected by an arc.

Figure 7:
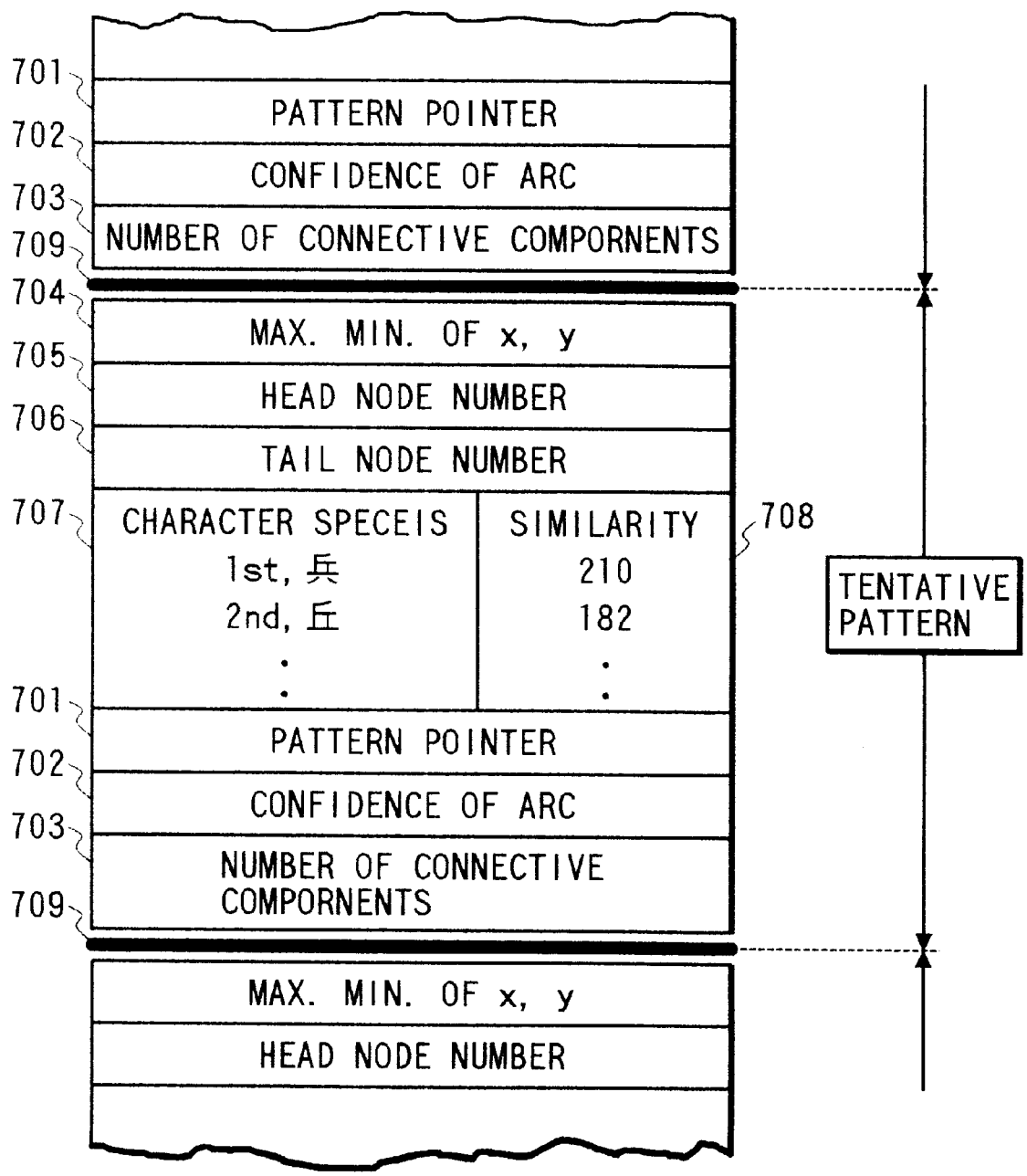
FIG. 7 is a diagram showing the data structure of the pattern table 219 in FIG. 2.

FIG. 7 shows the data stored in the pattern table 219. Indicated by 701 is a pointer which points a memory location where image information segmented as a tentative character pattern is stored. Location 702 stores the credibility of the arc which corresponds to this tentative character pattern (the credibility indicative of the weight differs depending on the distance between the nodes). Location 703 stores the number of connected components in the tentative character pattern (e.g., it is three for character pattern " 三" and it is two for character pattern " 八"), and location 704 stores the x and y coordinates of the tentative character pattern (coordinates of the top left and bottom right corners of a block which surrounds the tentative character pattern). Location 705 stores the node number of the node at the head of the arc, and location 706 stores the node number of the node at the end of the arc. By making reference to these node numbers, the pattern data can be expressed in the form of the segmentation hypothesis network of the tentative character pattern. Location 707 stores several candidate characters obtained at character classification 207 of the tentative character pattern by making reference to the character classification dictionary 208, and location 708 stores the values of similarity of the candidate characters with respect to the tentative character pattern.

The manner of calculating the similarity is arbitrary, and any known scheme can be employed. Bold lines 709 indicate the range of the table space for one tentative character pattern, and this range corresponds to one arc. For example, for the tentative character pattern of "兵", the range corresponds to the arc 604-1. Accordingly, the node number in 705 of the preceding node is ⓪, and that in 706 of the following node is ②.

Figure 8:
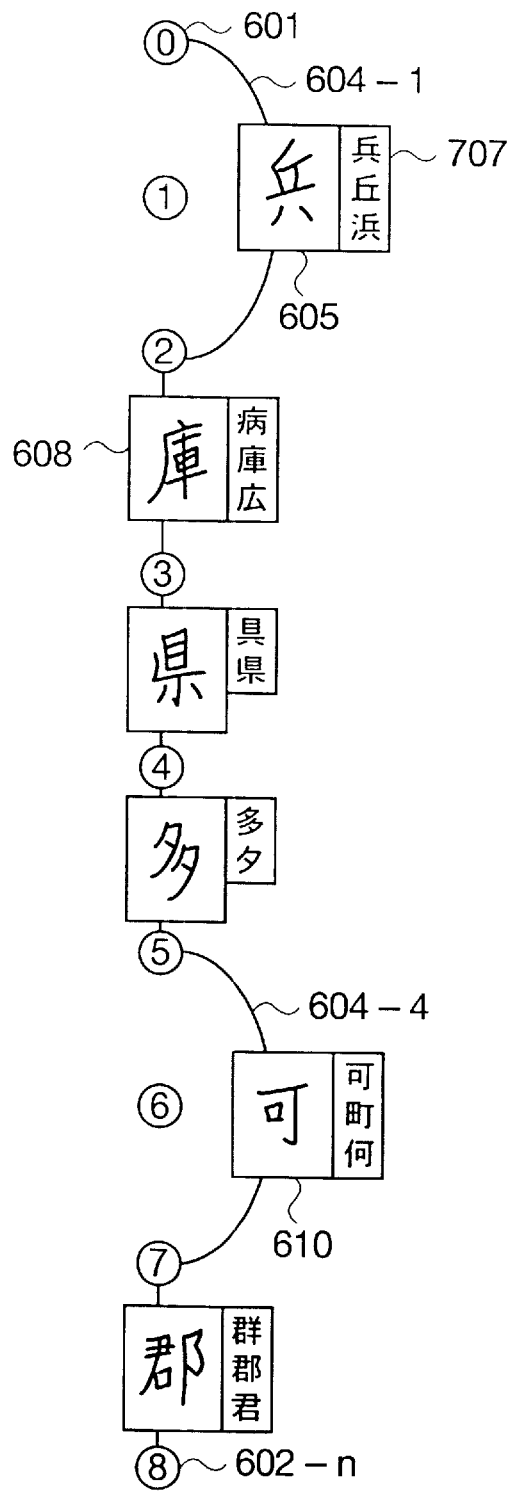
FIG. 8 is a conceptual diagram showing a string of tentative character patterns determined uniquely by the tentative pattern determination process 209 of FIG. 2.

FIG. 8 is a diagram explaining the tentative pattern determination process or decision of character in FIG. 2. Shown in the figure are tentative character patterns determined uniquely by the tentative pattern determination process 209 based on the data in the pattern table 219. The tentative pattern determination process 209 registers, as credibility 702, the similarity of candidate characters resulting from character classification for all tentative character patterns in the pattern table, sums the values of credibility of arcs existing along possible routes from the node 0 to the node ⑧, and determines a string of tentative character patterns on the route with the largest summed value of credibility to be the tentative pattern segmented. The example of FIG. 8 shows the route with the largest summed value of credibility, which connects the nodes ③, ④, ⑤, ⑦, and ⑧.

Comparing FIG. 8 with FIG. 6 reveals that the arcs 604 from node ⓪ to node ①, from node ① to node ② and from node ① to node ③, and the arcs 604 from node ④ to node ⑥, from node ⑤ to node ⑥ and from node ⑥ to node ⑦ in the network of FIG. 6 are absent in FIG. 8. Accordingly, by conducting the assessment of all tentative character patterns in the pattern table 219 based on the character classification, character segmentation is determined (209 in FIG. 2) based on the tentative character patterns of enhanced credibility.

Figure 9:
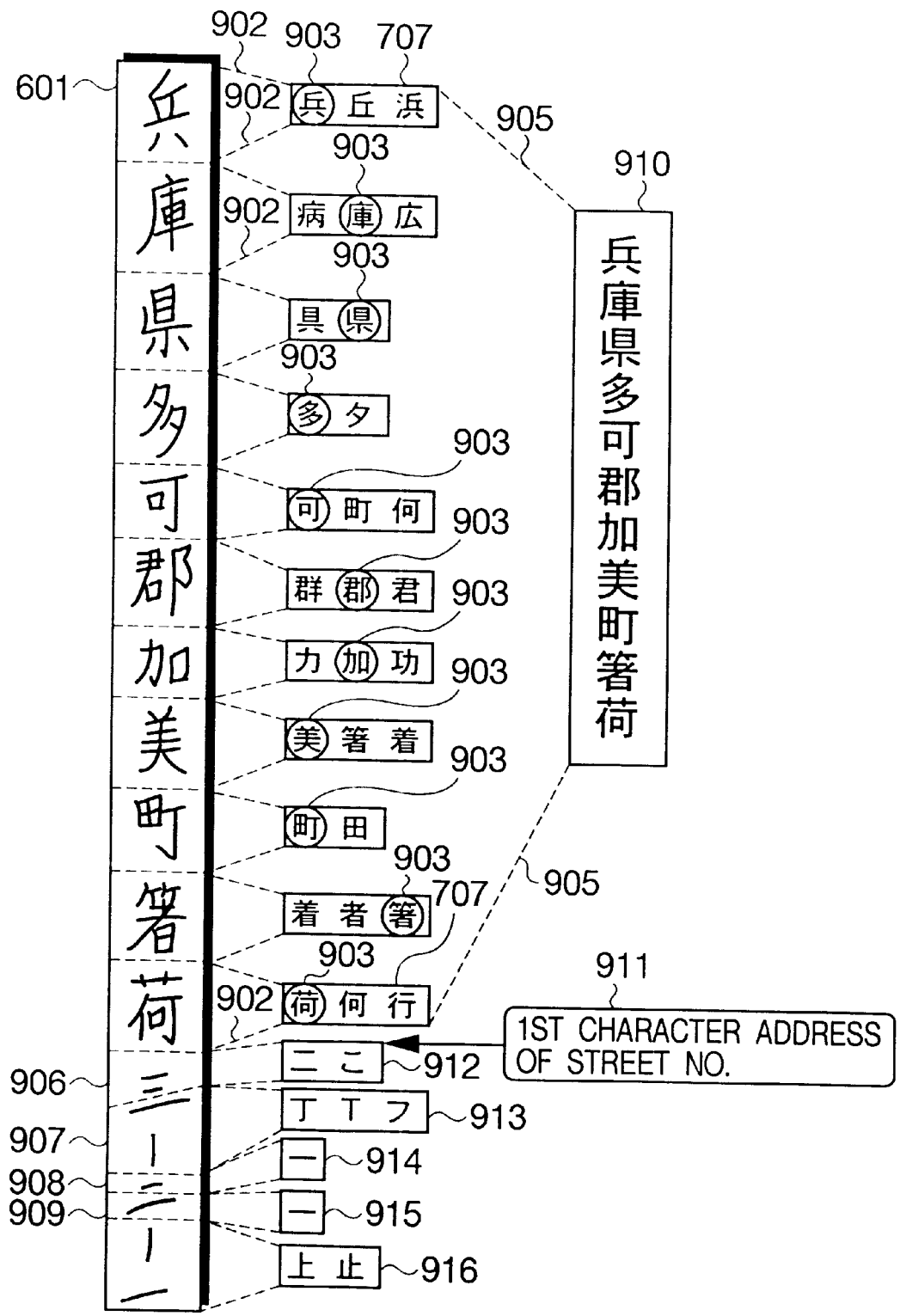
FIG. 9 is a diagram used to explain the lattice generation process 210 and town matching process 211 of FIG. 2.

FIG. 9 is a diagram explaining the result of character recognition for the town name portion produced by the town matching process 211 for the received character classification result for the uniquely determined segmentation, and also explaining the head position of the street number portion. Reference numeral 601 indicates the image of an address character string to be recognized, a dashed line 902 indicates the border line of determined character segmentation, i.e., node, and 707 indicates a set of candidate characters as a result of character classification for a segmented tentative character pattern. A character 903 enclosed in circle is the character selected as a result of town matching (211 of FIG. 2) for the candidate characters 707. Selected characters "兵", "庫", ..., " 荷" are combined to produce a character string 910 as a result of recognition of the town name. A pair of dashed lines 905 indicate the range of input image 601 to which the character string determined by town matching corresponds. The head position 911 of the street number portion is determined by the town matching process 211.

In the figure, indicated by 906, 907, 908 and 909 are tentative character patterns of the street number portion, and 912 through 916 are sets of character strings as a result of character classification for the tentative character patterns of the street number portion. These candidate characters are already obtained by the processes up to the lattice generation 211. The address section following the street number head position 911 is written in Kanji-numerals or Arabic numerals in most cases, and therefore the process of character segmentation of this portion is different from that for the town name portion which is written in Kanji characters. Otherwise, if the character segmentation process for the town name portion is applied to the street number portion, character patterns " 三" and " 二" are often divided into tentative character patterns 906 and 907 and tentative character patterns 908 and 909, respectively. In addition, fewer kinds of characters are used in this portion.

Figure 10:
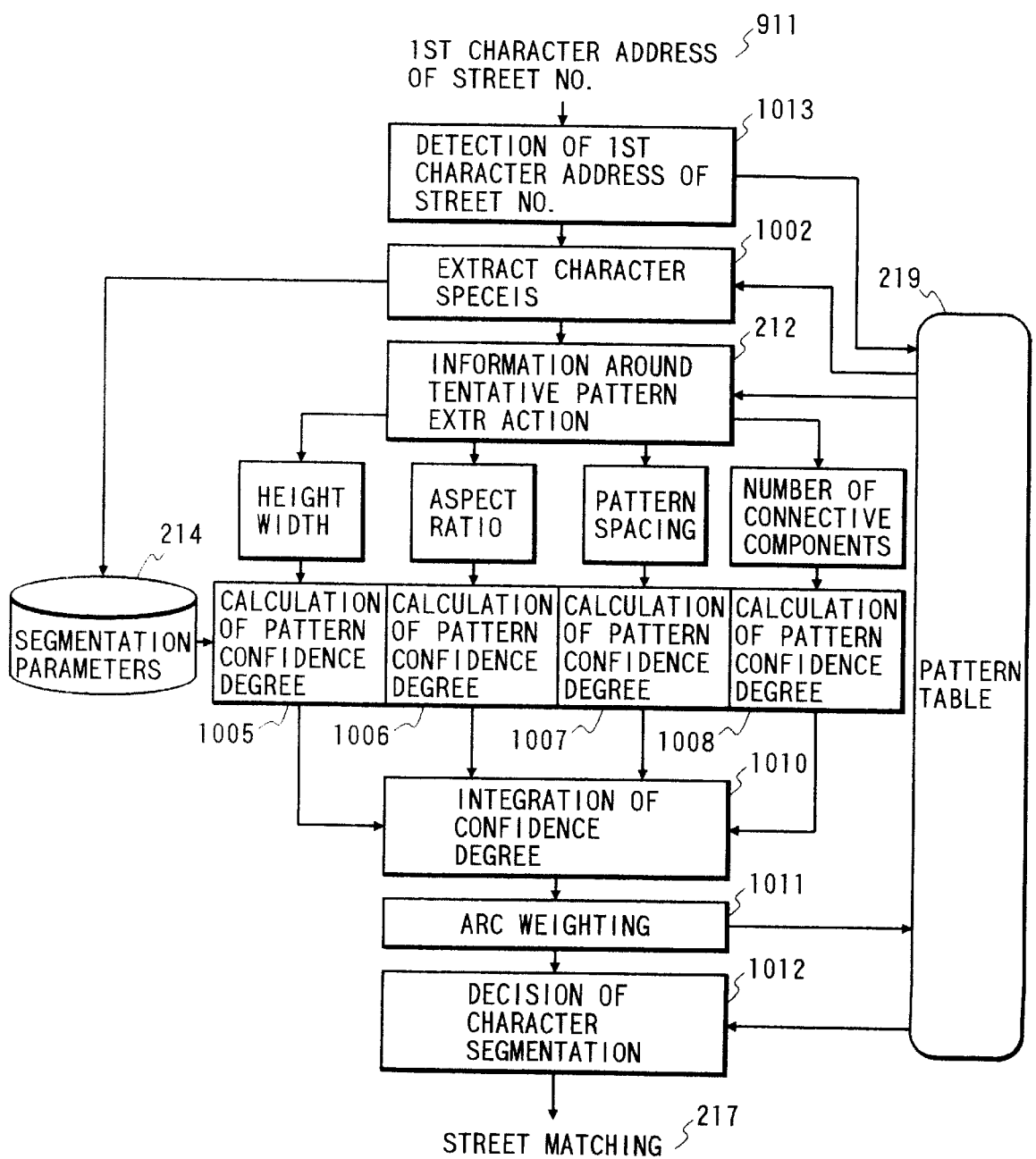
FIG. 10 is a diagram used to explain the character segmentation recurrent determination process 215 of FIG. 2 for dealing with Kanji-numerals and Arabic numerals in the street number portion.

FIG. 10 is a flowchart of the process of the recurrent determination of character segmentation for the street number portion, which is the processes from pattern periphery information extraction 212 up to character segmentation recurrent determination 215 in FIG. 2. Examples of character pattern will be explained in detail later in connection with FIG. 11 through FIG. 14.

The head of street number portion is detected (1013) from the input information 911 provided by the town matching process 211, and a recognition-candidate character of the tentative character pattern of the street number portion is clipped as character species information from the pattern table 219:(1002). In this embodiment, the candidate character with the highest similarity in the candidate character string resulting from character classification 207 is adopted as the character species information. The segmentation dictionary or parameters 214 are accessed for reference with the clipped character species information as the key. At character species clipping 1002, periphery information for the tentative character pattern which corresponds to the character species is extracted: (212). The periphery information is data of the vertical and horizontal lengths, vertical/ horizontal ratio, pattern spacing and number of connected components of the tentative character pattern.

The segmentation dictionary 214 is accessed for reference with the character species as the key to obtain the likelihood ratio for the periphery information including the vertical and horizontal lengths, vertical/horizontal ratio, pattern spacing and number of connected components. This dictionary 214 contains values of likelihood ratio against periphery information, and the likelihood ratio for each periphery information is calculated as the credibility: (1005, 1006, 1007, 1008). The calculated values of credibility or confidence degrees are integrated: (1010). The likelihood ratio L(e$_k$|H) for a feature value e$_k$ is calculated from the event H of correctness of the segmented tentative character pattern as the classified character species, the feature values e$_1$, e$_2$, e$_3$, . . . , e$_n$ of pattern periphery information and the probability of occurrence P(e|H) of e of the case of the event H, as follows.

$$L(e_k | H) = \frac{P(e_k | H)}{P(e_k | \overline{H})} \quad (1)$$

For the probability of occurrence P(H) of H, the probability of occurrence P(H|e$_1$, e$_2$, e$_3$, . . . , e$_n$) of H for the feature values e$_1$, e$_2$, e$_3$, . . . , e$_n$, is obtained by using multiple likelihood ratios resulting from the formula (1) based on the Bayes rule as follows.

$$P(H | e_1, e_2, e_3, \ldots, e_n) = \frac{\frac{P(H)}{P(\overline{H})} \prod_{k=1}^{n} L(e_k | H)}{1 + \frac{P(H)}{P(\overline{H})} \prod_{k=1}^{n} L(e_k | H)} \quad (2)$$

The credibility integrating process 1010 integrates the likelihood ratios calculated in the processes 1005, 1006, 1007 and 1008 by using the formula (2) based on the Bayes rule. Subsequently, the arcs are weighted by the integrated credibility multiplied by the similarity resulting from character classification: (1011). Based on the data of tentative character pattern derived from the weighted arc, the optimal route which runs from the first node to the last node is searched thereby to determine the character segmentation path: (1012). The result is used for street matching (217 of FIG. 2).

Figure 11:
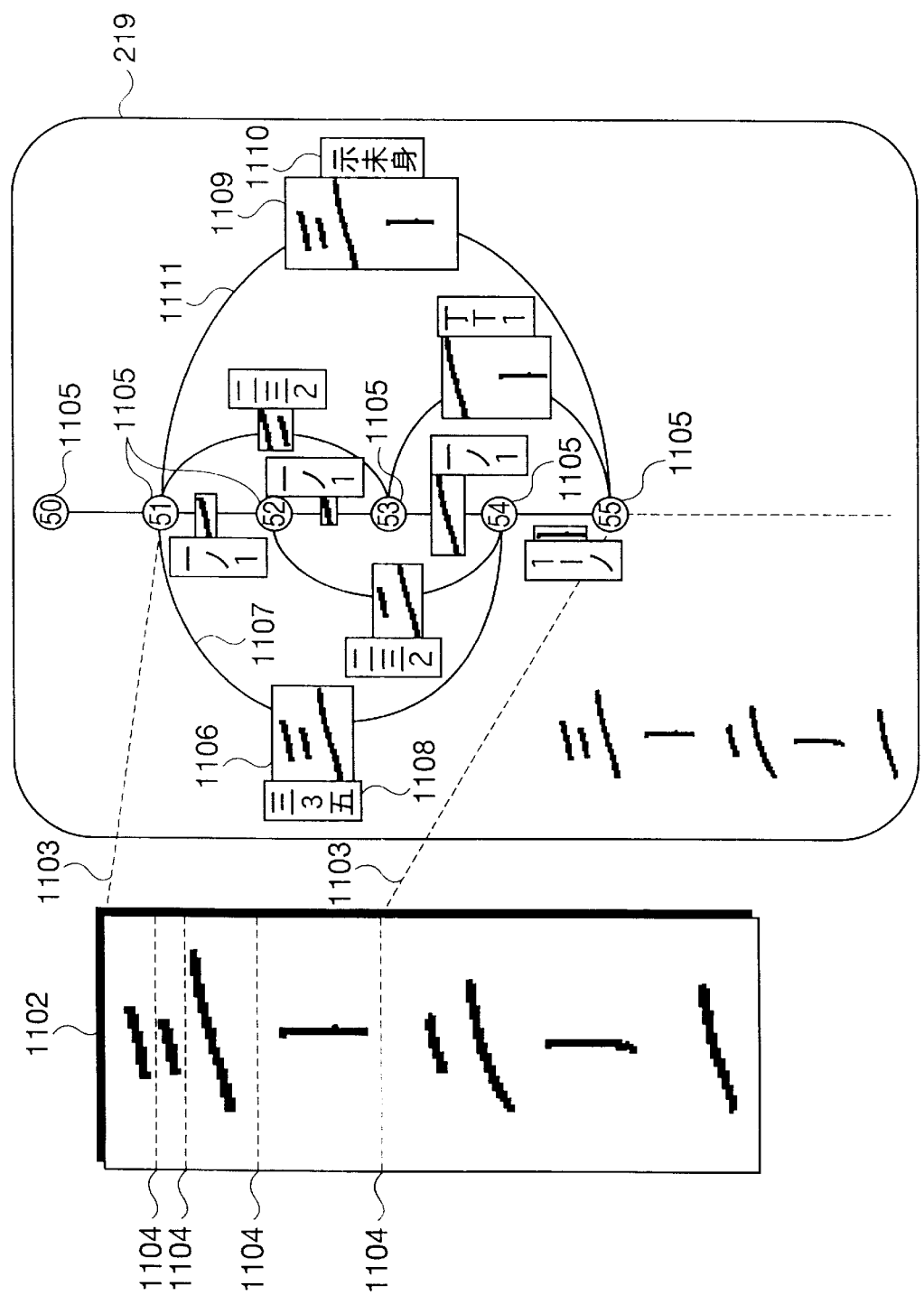
FIG. 11 is a diagram used to explain the character classification of the street number portion based on the correspondence between the input image and the tentative character patterns.

FIG. 11 is a diagram explaining the tentative character patterns of the street number portion of the address character string. The street number portion 1102 of the input image of the address character string is already segmented by the tentative pattern generation 206 of FIG. 2 based on the border lines 1104, and the result is stored in the pattern table 219. The data structure of the pattern table is the same as explained in connection with FIG. 6 and FIG. 7. A pair of dashed lines 1103 indicates the correspondence between the segmentation border lines 1104 and node numbers 1105 (50, 51, 52, . . . ,55 enclosed by circles). For example, processing of character classification for the tentative character pattern " 三" 1106 (it corresponds to arc 1107) produces candidate characters 1108 of " 三", "3" and " 五". Similarly, processing of character classification for the tentative character pattern " 三" 1109 (it corresponds to arc 1111) produces candidate characters 1110 of " 示", " 未" and " 身".

The arcs of these tentative character patterns are weighted as explained in connection with FIG. 10. Specifically, the character species " 示", " 未" and " 身" 1110 are improper characters for use in the street number portion, and therefore the weight of the arc 1111 which corresponds to the tentative character pattern 1109 is reduced. Based on this weighting process, arcs which are obviously improper for the street number portion are removed. The remaining tentative character patterns (e.g., " 二", " ▬▬▲", " ▬▬▲", "|", etc." undergo the respective weighting process so that improper arcs are removed.

Figure 12:
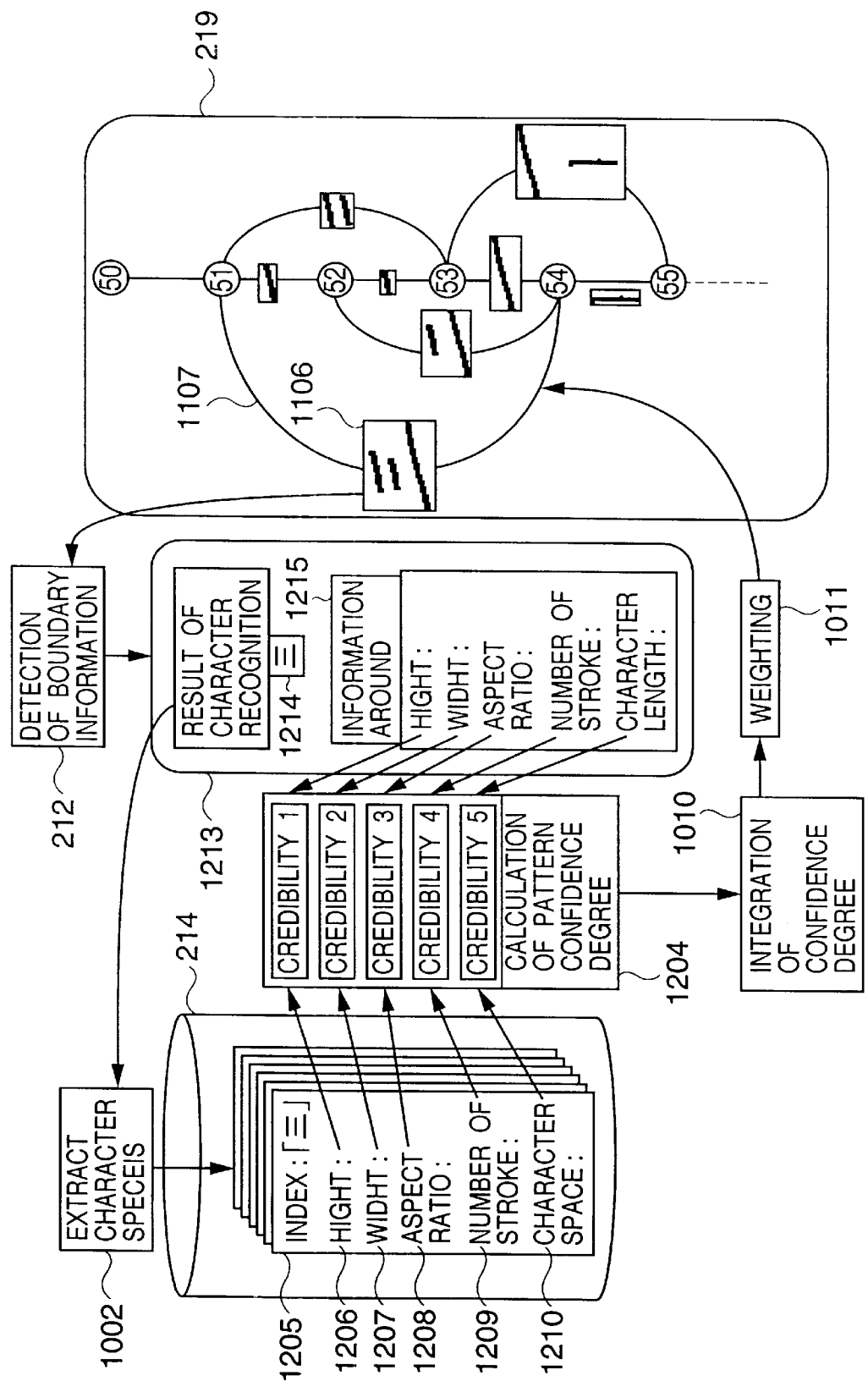
FIG. 12 is a diagram used to explain the process of calculating the credibility of tentative character patterns in FIG. 10.

FIG. 12 is a diagram explaining the arc weighting process 1011 in FIG. 10 for the tentative character pattern " 三" 1106 for example in the street number portion. Initially, periphery information is extracted from the tentative character pattern " 三": (212). The periphery information includes the values of height and width of character, aspect ratio, pattern spacing and number of connected components. At this time, the top-ranking candidate character " 三" among the candidate characters " 三", "3" and " 五" as a result of character classification is also referenced. This set of information is shown by 1214 and 1215 within the block 1213.

At character species clipping 1002, the information 1214 of the character species " 三" is sent to the segmentation dictionary 214. The segmentation dictionary 214, which is accessed for reference with the character species as the key, contains data 1205 used for the weighting of arcs. The character species provided by the character species clipping 1002 is used to for the key to search the index " 三" in the segmentation dictionary 214. Upon detecting the data 1205 with the index " 三", the likelihood ratios corresponding to the vertical length (or height) 1206, horizontal length (or width) 1207, aspect ratio 1208, number of connected components 1209 and pattern spacing 1210 are read out, the values of credibility of the periphery information is evaluated: (1204), the likelihood ratios or confidence degree (credibility: 1,2,3,4,5) are integrated: (1010), and the arc 1107 relevant to the tentative character pattern " 三" 1106 is weighted: (1011). Accordingly, the pattern periphery information reflects on the arc 1107 of the tentative character pattern 1106, whereby optimal weighting depending on the character species is implemented.

Figure 13:
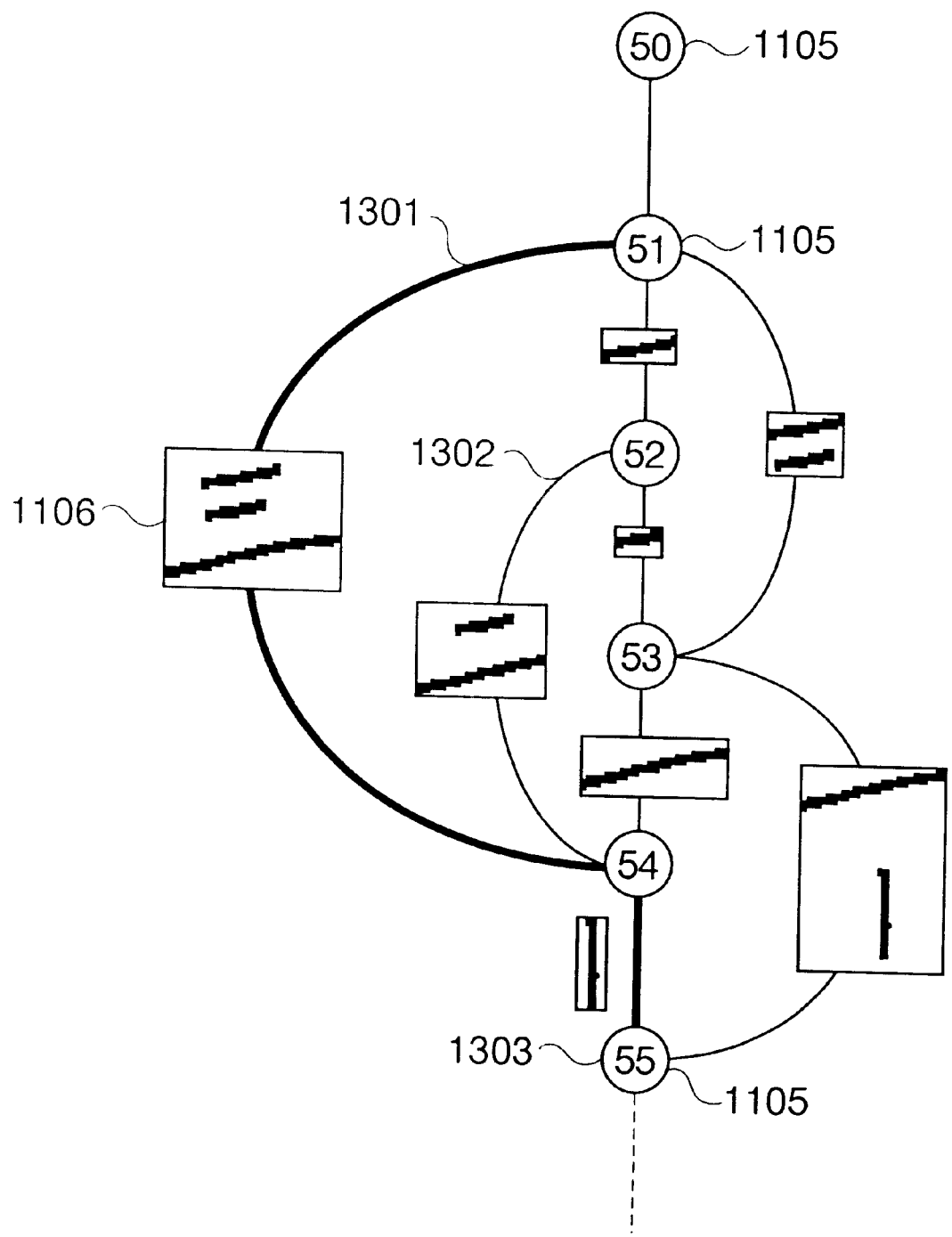
FIG. 13 is a diagram showing the result of calculation of the credibility of patterns and weighting to the arcs of tentative character segmentation for the street number portion.

FIG. 13 is a diagram showing the result of weighting in terms of the thickness of arc line. Indicated by 1301 is the arc which is weighted in accordance with the periphery information for the tentative character pattern " 三" 1106. Arc 1303 has an increased weight in accordance with the periphery information for the tentative character pattern "|". Arc 1302 which connects nodes ⓔ and ⓔ is of a tentative character pattern that resembles character pattern " 二" formed of two lower connected components of the pattern " 三." Character classification for the tentative character pattern " 二" produces candidate characters of character species " 二", " 三" and "2" as shown in FIG. 11, of which the character species " 二" having the greatest similarity can possibly be judged erroneously to be a correct assumption. However, the periphery information reveals that this pattern of the arc 1302 has a narrow spacing from the pattern immediately above it, causing it to have its credibility lowered when the segmentation dictionary 214 is referenced. Accordingly, the arc 1302 has a smaller weight than the case of weighting based solely on the similarity, and it is smaller than the weight of the arc 1301. Consequently, the route including the arc 1302 has a smaller total weight relative to the route include the arc 1301.

Figure 14:
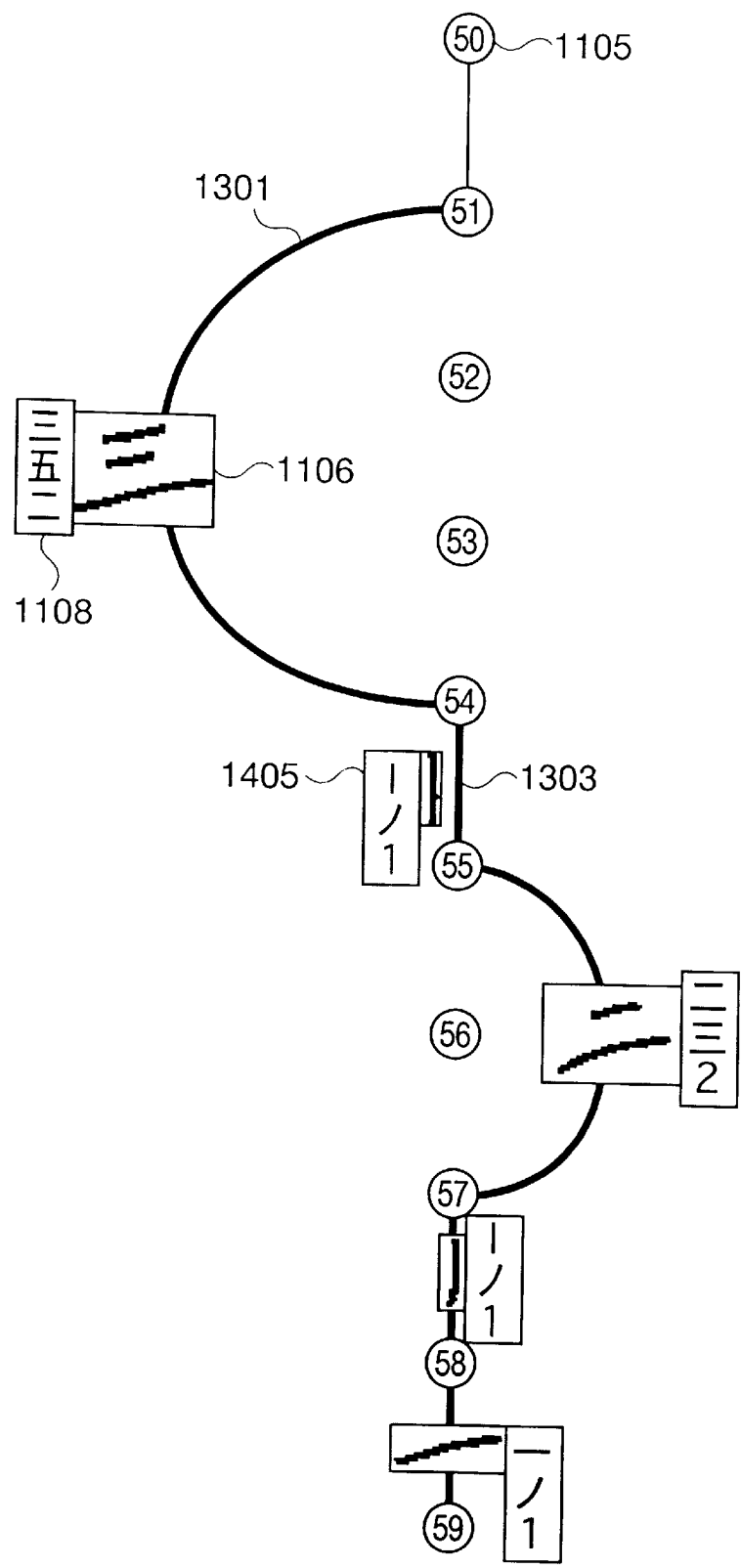
FIG. 14 is a diagram showing the character segmentation selected at the recurrent determination of character segmentation for the street number portion.

FIG. 14 shows a string of tentative character patterns selected by the recurrent determination of character segmentation for the street number portion. Specifically, weights are applied to the arcs for the tentative character patterns by the arc weighting process (1011 of FIG. 10), and a path having the largest sum of weights is determined. Then, the route including the arc 1301 of the tentative character pattern " ≡ " and arc 1303 of "|" is selected. Namely, for the recurrent determination of character segmentation for the street number portion, arcs corresponding to tentative character patterns " ≡ ", "|", " ≡ ", "|" and " ━━━ " are selected to form a path. The candidate character string relevant to the patterns of the selected arcs is used to generate the lattice of the street number portion: (216).

Figure 15:
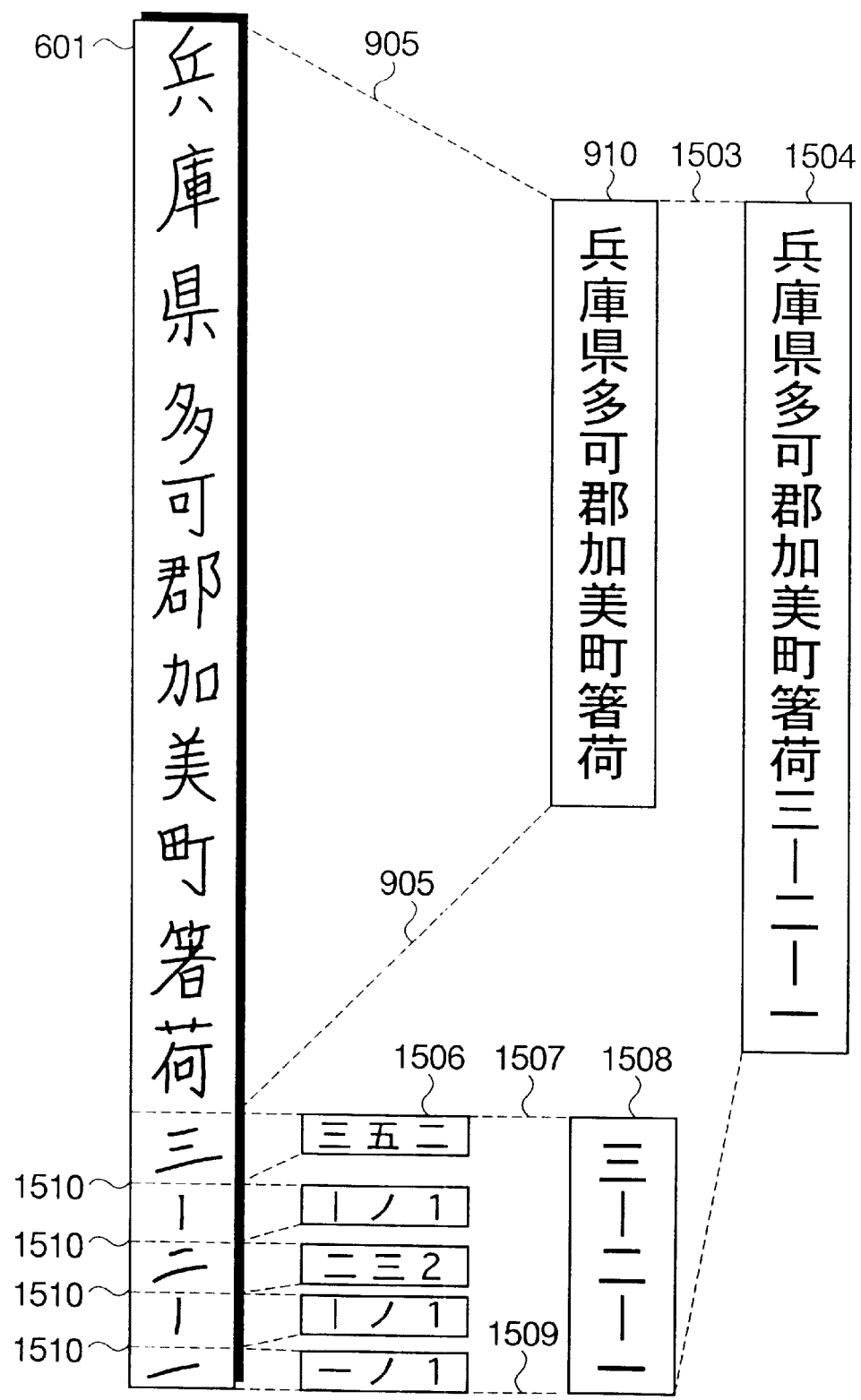
FIG. 15 is a diagram showing the result of recognition of the whole address character string produced by combining the recognition results of the town name portion and street number portion.

FIG. 15 shows the result of recognition of the whole address character string based on this embodiment. Namely, this is the result of character segmentation specialized for the street number portion, lattice generation, street number matching, and integration of the street number portion to the result of town matching. A pair of dashed lines 905 led out of the input image 601 of the address character string indicate the range of the town name portion, and 910 indicates the result of town name matching. Dashed lines 1510 indicate the boundaries of recurrent determination of character segmentation, and a set of characters 1506 are candidate characters resulting from character classification of each character. Dashed lines 1507 and 1509 indicate the range of the street number portion, and a character string 1508 is the result of street number recognition obtained by street number matching 217 from the candidate sets of characters of the result of character classification, i.e., it is the result of recognition of the street number. Character string 1504 is the result of recognition of the whole address character string produced by connecting the street number matching result 1508 to the town name matching result 1502. By retrying the character segmentation for the street number portion only and combining the result with the town name matching result in this manner, the accuracy of recognition of the whole address character string is improved.

Figure 16:
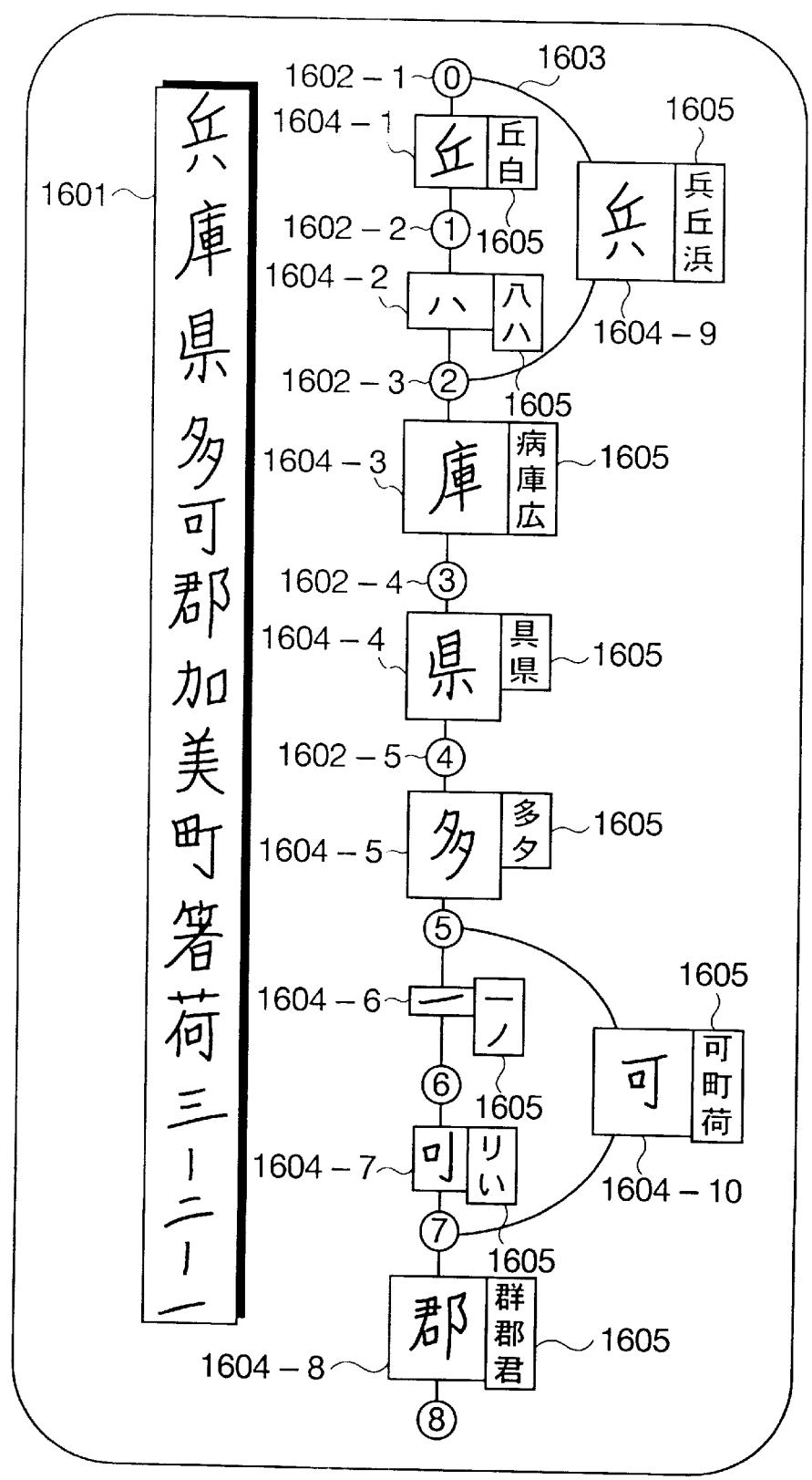
FIG. 16 is a diagram showing an example of display on the screen for the tools used for the maintenance and the expansion of function of the inventive address recognition apparatus and the creation and revision of the dictionaries.

FIG. 16 shows an example of display on the screen showing the input address character string and the pattern table for character segmentation and the result of character classification. Shown on the screen 1600 of the display device 310 of FIG. 3 are the image of input address character string 1601, nodes 1602-i (i=1,2, . . . ,8) of pattern table, arcs 1603-1 and 1603-4 which connect the nodes, arcs which connect adjacent nodes, tentative character patterns 1604-j (j=1,2, . . . , 10), and sets of candidate characters 1605 obtained by character classification for the tentative character patterns 1604-j. This display on the screen 1600 of the display device 310 enables the intuitive understanding of the character segmentation and the progress of character classification process during the address character string recognition process, and it is useful for the maintenance and the expansion of function of the apparatus. It is necessary to collect periphery information of patterns segmented based on the assumption at the creation or revision of the segmentation dictionary 214.

Referring to the formula (1), a likelihood ratio stored in the character segmentation dictionary has a value that is the distribution of periphery information of tentative characters of the case of correct character segmentation divided by the distribution of periphery information of tentative characters of the case of incorrect character segmentation. On this account, when the apparatus is designed to release such information as values of periphery information and character classification result in response to the specification of an arc with a pointer on the displayed screen as shown in FIG. 16, it becomes possible to easily collect pattern periphery information separately for the cases of correct segmentation and incorrect segmentation. The displayed tools are effective also for the collection of character patterns required at the creation and revision of the character segmentation dictionary.

Figure 17:
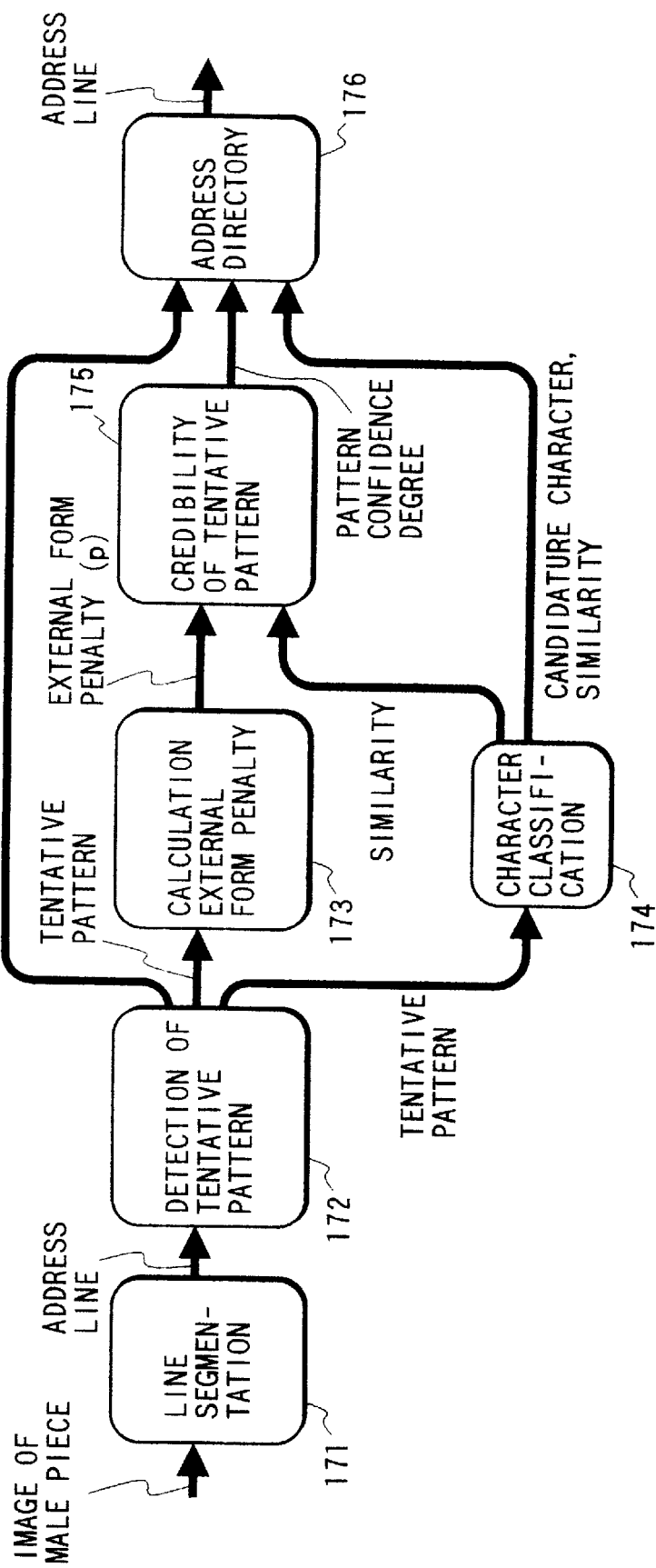
FIG. 17 is a flowchart showing an example of the overall processing of this invention.

FIG. 17 is a flowchart showing the character reading method based on another embodiment of this invention. This embodiment is also the application of a character reading method to the automatic postal address reading apparatus arranged as explained in connection with FIG. 3.

The address line segmentation process 171 extracts the address block region from the video signal of the mail surface. The next tentative pattern segmentation process 172 extracts tentative character patterns from the character string to produce a segmentation hypothesis network. The external form penalty calculation process 173 calculates the external form penalty (p) of each tentative character pattern. The character classification process 174 classifies each tentative character pattern and produces multiple candidate character species codes and the similarity of the tentative character pattern and candidate character. The pattern credibility calculation process 175 calculates the credibility of each tentative character pattern based on the similarity and external form penalty. The address dictionary matching process 176 selects tentative character patterns based on the credibility of pattern and compares the candidate character species resulting from character classification with the address dictionary.

Figure 18:
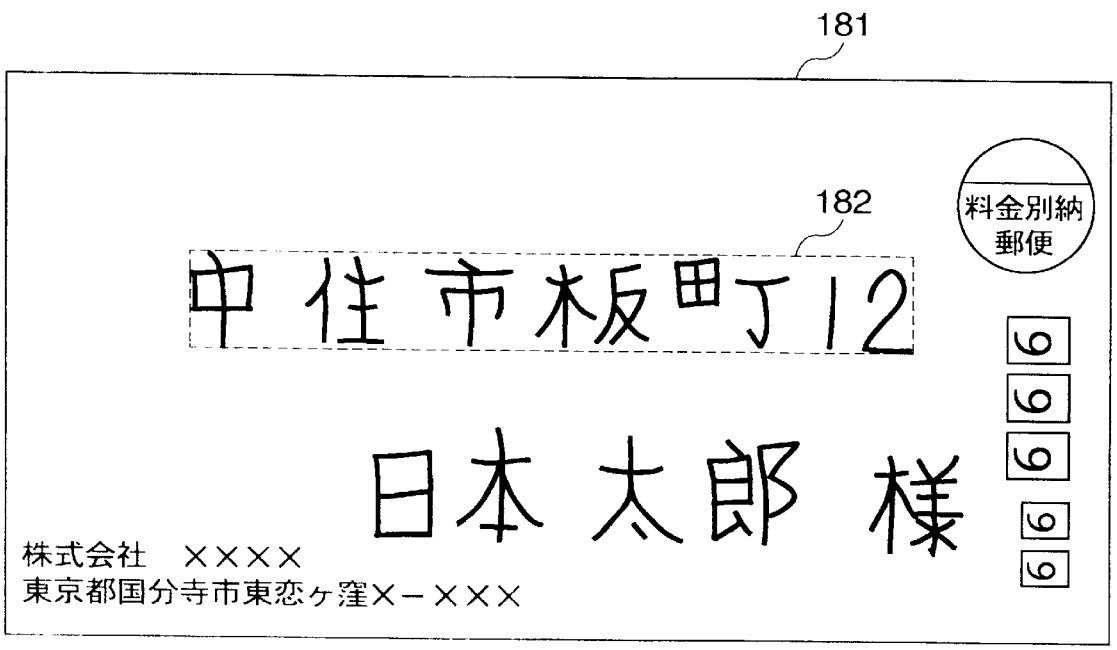
FIG. 18 is a diagram showing an embodiment of this invention.

FIG. 18 shows a displayed image of the mail surface. The address line segmentation process 171 extracts from the mail piece image 181 a rectangular area 182 which includes a written character string of town name and street number. The area 182 may include more than one character string of address, and the process extracts the area of these character strings in such case. The manner of address block extraction is the same as the preceding embodiment.

Figure 19:
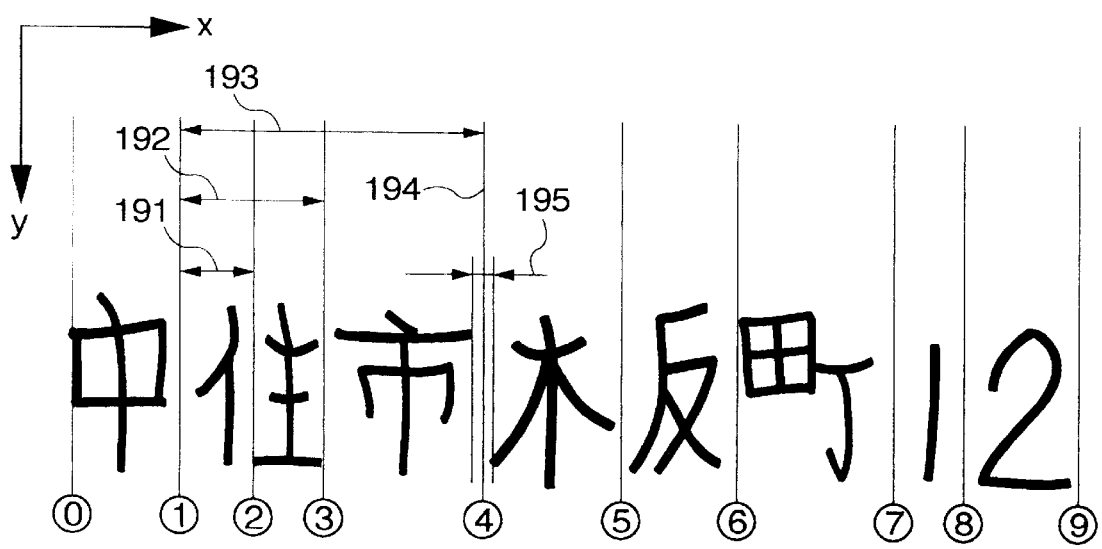
FIG. 19 is a diagram showing the relation between patterns and their boundaries.

The tentative pattern segmentation process 172 will be explained with reference to FIG. 19 which shows the enlarged image of the character string within the area 182. In the figure, vertical lines numbered by 0 through 9 are candidates of boundaries. The candidate boundary is the gap between such rectangles as described in the TECHNICAL REPORT OF IE88-138, "A Method to Character Segmentation for Printed Character Lines Including Character Lines of Irregular Pitches". The x-axis coordinate of the left end of the character pattern on the right-hand side of a boundary subtracted by the x-axis coordinate of the right end of the character pattern on the left-hand side of the boundary is called "border gap", and the average value of the x-axis coordinate of the left end of the character pattern on the right-hand side of a boundary and the x-axis coordinate of the right end of the character pattern on the left-hand side of the boundary is called "border coordinate". For example, the border coordinate for the boundary numbered by 4 is the x-axis coordinate of the boundary 194, and the border gap is the width 195.

Subsequently, a combination of boundaries, for which the difference of border coordinates does not exceed the character size which is inferred from the height of character string, is examined and patterns between these boundaries are registered as tentative character patterns. In the example of FIG. 19, the border coordinate differences 191 and 192 do not exceed the inferred character size, while the border coordinate difference 193 exceeds the character size. Therefore, the character pattern between boundaries ⓪ and ① and character pattern between boundaries ⓪ and ② are registered, and the character pattern between boundaries ⓪ and ③ is rejected.

FIG. 20 shows the format of the pattern table which contains data of arcs of the segmentation hypothesis network produced by the tentative pattern segmentation process 172. Each record of the pattern table corresponds to one tentative character pattern. The table consists of a field 2001 for storing the profile of a pattern described in chain code, fields 2002 and 2003 for storing the left-hand border number and right-hand border number of the tentative character pattern, a field 2004 for storing the candidate character species as the result of character classification, a field 2005 for storing the values of similarity of the candidate character species in the field 2004, and a field 2006 for storing the credibility of the pattern. Among these items, the border number begins with 0 position at the left extreme of a character string and ascends as the boundary shifts from left to right, and up to three candidate character species and values of similarity are stored by being left-justified in the fields 2004 and 2005, with vacant spaces of the fields 2004 and 2005 being filled with null codes and "0"s, respectively.

FIG. 21 shows the format of the boundary table which contains data of nodes of the segmentation hypothesis network produced by the tentative pattern segmentation process 172. Each record of the boundary table corresponds to one boundary. The table consists of a field 2101 for storing the border number, a field 2102 for storing the border coordinate, and a field 21-3 for storing the border gap.

The character classification process 174 used in this embodiment is the known process. Among characters including Kanji characters, Hiragana characters, Katakana characters, Arabic numerals and symbols, those used to describe town names and street numbers are treated for character recognition. The output of character classification is multiple candidate character species and values of similarity of the input character pattern with respect to the standard pattern of individual candidate character species.

FIG. 22 is a flowchart of the external form penalty calculation process 173. The tentative character pattern as the input of this process is expressed by a record in the pattern table (FIG. 2) and a boundary table (FIG. 21). Multiple segmentation assessment processes 2201, 2202 and 2203 are conducted for each tentative character pattern for the assessment of the assumption of erroneous segmentation. The greater the outputs pi (i=1,2,1) of the process, the higher is the credibility of the assumption of erroneous segmentation. The outputs pi are summed by the process 2204, and the result is delivered as the external form penalty p.

FIG. 23 is a diagram explaining the types of segmentation error of FIG. 22, showing seven types of erroneous segmentation processes E1 through E7. In the figure, a solid image expresses the tentative character pattern in attention, a dashed-line block expresses a rectangle which confines the correct character pattern, and a bored image expresses part of the pattern in the periphery of the tentative character pattern. For example, erroneous process E1 indicates the assumption of erroneous segmentation of the left-hand side of a character for the assumed pattern in attention. Erroneous process E7 indicates the assumption of erroneous segmentation of two characters for the assumed pattern in attention.

Figure 24:
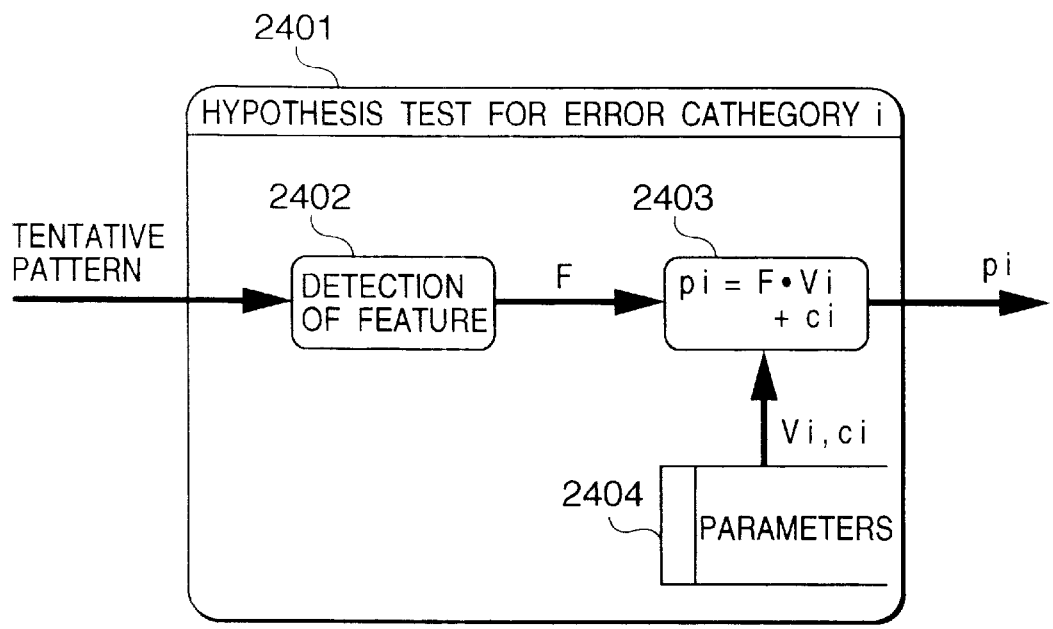
FIG. 24 is a flowchart showing the segmentation error assessment process.

FIG. 24 is a flowchart showing the erroneous segmentation assessment process. The tentative character pattern as the input of this process is expressed by a record (character species) in the pattern table and a boundary table. The erroneous segmentation assessment process 2401 corresponds to one of assumption assessment processes 2201, 2202 and 2203. The feature extraction process 2402 extracts features such as the character pattern size and positional relation with neighboring character patterns, from the input tentative character pattern. The feature is treated as a n-order vector as follows.

$$F=(f1, f2, \ldots, fn)$$

Subsequently, the process 2403 evaluates the penalty pi from the feature F. The penalty pi is the value of the linear recognition function which distinguishes a correctly segmented character pattern from erroneous results such as those of the processes Ei in FIG. 23, and it is defined as follows.

$$pi = F \cdot Vi + ci$$

where Vi is the weight vector of the linear recognition function, ci is a constant, and F·Vi is the inner product of Vi and F.

The values of Vi and ci are determined based on learning in the manner explained later and stored in the parameter dictionary 2204 in advance. As an alternative scheme different from this embodiment, parameter dictionaries may be switched in response to the candidate character resulting from character classification.

Figure 25:
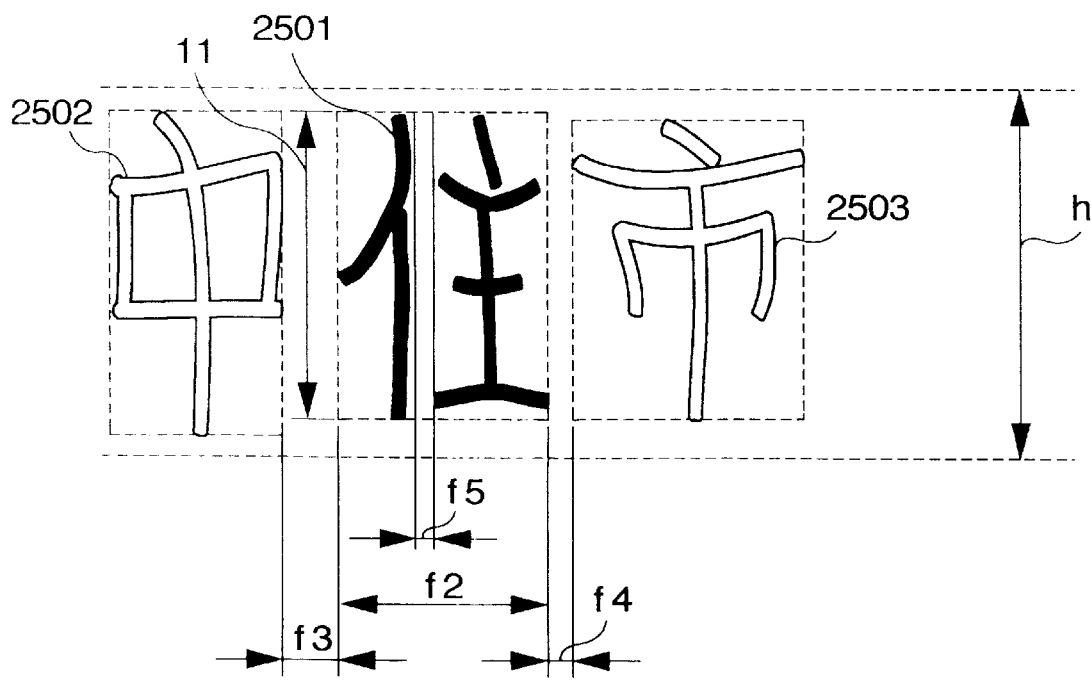
FIG. 25 is a diagram showing the feature values used in the segmentation error assessment process.

FIG. 25 is a diagram showing a character pattern used to explain the above-mentioned feature F. In the figure, a solid image 2501 expresses the tentative character pattern in attention, and bored images 2502 and 2503 express the adjacent character patterns. A dashed-line block expresses a rectangle which confines each character pattern.

In this example, the order n of the feature F is 6, and individual feature values are defined as follows.

f1: Height of the character pattern in attention
f2: Width of the character pattern in attention
f3: Spacing of the character pattern in attention with the left-adjoining character pattern
f4: Spacing of the character pattern in attention with the right-adjoining character pattern
f5: Maximum gap of the character pattern in attention
f6: Number of connected components of the character pattern in attention Although the same feature values are used for all erroneous segmentation assessment processes in this example, different feature values may be used for each process. Alternatively, each feature value may be normalized with respect to the general feature of the character string such as the height h of character string.

Figure 26:
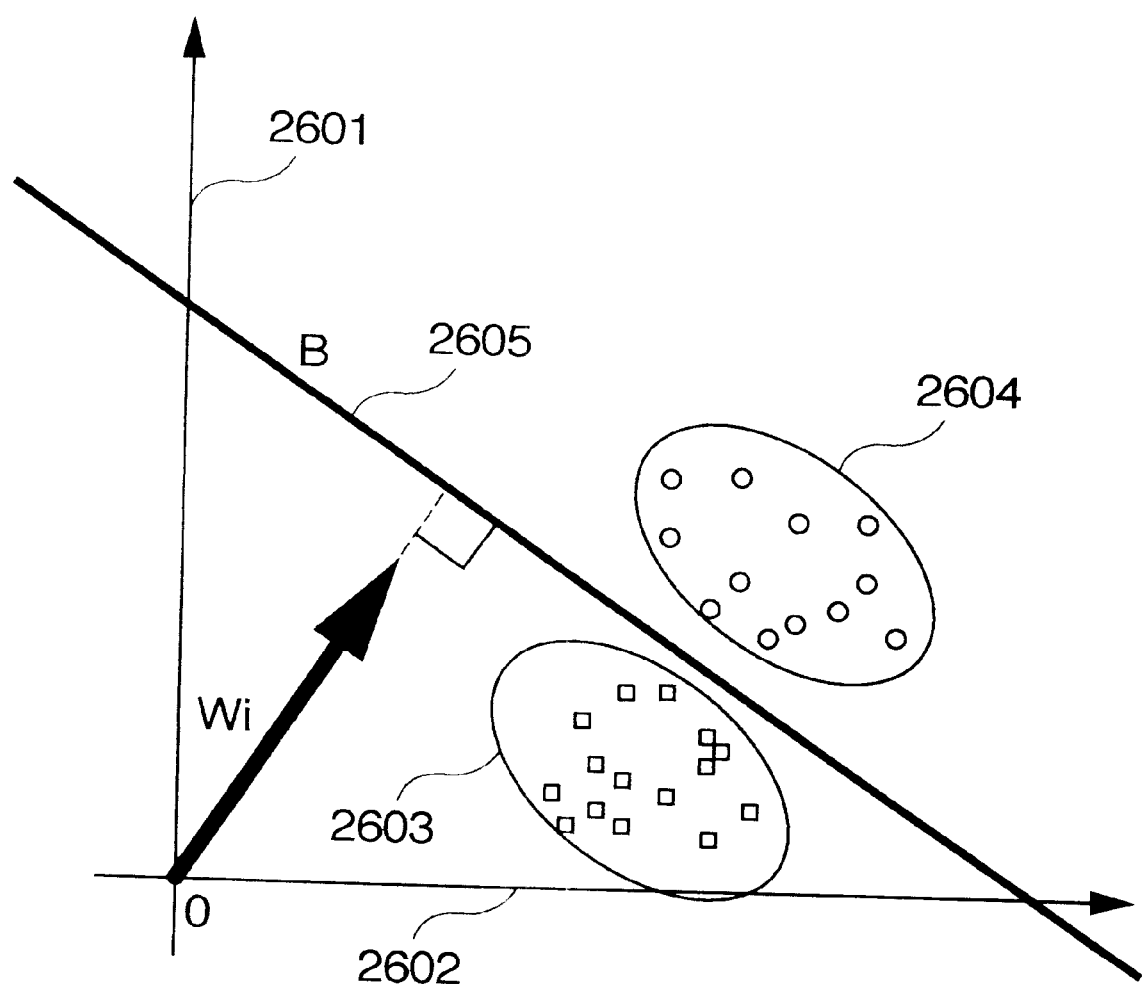
FIG. 26 is a diagram showing the principle of the segmentation error assessment process.

FIG. 26 is a diagram used to explain the principle of the erroneous segmentation assessment process. Shown by 2601 and 2602 are two coordinate axes out of n-order Euclid space. A pattern group 2603 is the distribution of feature F of the correctly segmented tentative character patterns, and another pattern group 2604 is the distribution of feature F of the tentative character patterns with the erroneous segmentation assumption Ei. In the figure, indicated by Wi is the weight vector of the recognition function which distinguishes the pattern groups 2603 and 2604, and it intersects with the hyperplane B which separates the pattern groups 2603 and 2604.

The hyperplane B is express to be a set of F that meet the following formula.

$$(Wi \cdot F) = a \cdot |Wi|$$

where a is the Euclid distance from the origin to the hyperplane B, Wi·F is the inner product of Wi and F, and |4Wi| is the norm of Wi.

The linear recognition function which distinguishes the groups 2603 and 2604 has its value d given as follows.

$$d=(Wi \cdot F)-a \cdot |Wi|$$

The F belongs to the group 2604 if d is greater than 0, or otherwise it belongs to the group 2603.

The Wi and a·|Wi| can also be evaluated by the manner described in publication "Recognition Engineering", by Toriwaki, ISBN4-339-01059-6, C3355, P2781E, pp.113–119, published by Korona co. However, the use of the value of d intact for the value pi of the linear recognition function is not appropriate due to a different distribution of each Ei in the Euclid space. On this account, the following normarized value of linear recognition function is used for pi.

$$pi = d/(s \cdot |Wi|)$$
$$= (Wi \cdot F)/(s \cdot |Wi|) a/s$$

where s is the variance of d for the set including both of 2603 and 2604.

Accordingly, the weight vectors Vi and constants ci of the linear recognition function stored in the parameter dictionary 1104 are obtained as follows.

$$Vi=Wi/(s \cdot |Wi|)$$
$$ci=a/s$$

Next, the pattern credibility calculation process 175 will be explained in brief. The pattern credibility indicates the degree of credibility of arcs on the segmentation hypothesis network, i.e., candidate patterns, and it is evaluated as follows.

Pattern credibility=$\{c1 \cdot (similarity\ of\ top\text{-}ranking\ candidate\ character)-c2 \cdot p\}$ where p is the external form penalty and c1 and c2 are constants specific to the system.

Figure 27:
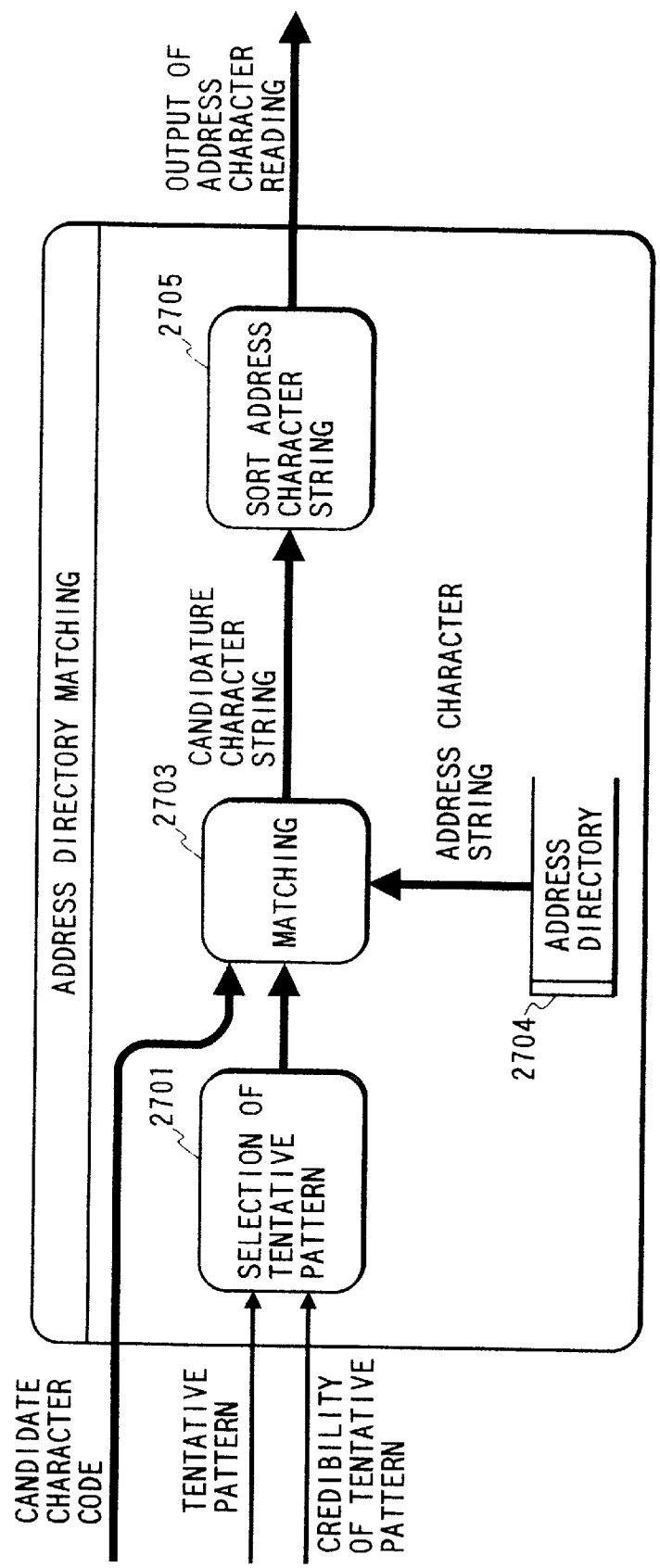
FIG. 27 is a flowchart showing the address dictionary matching process.
Figure 34A:
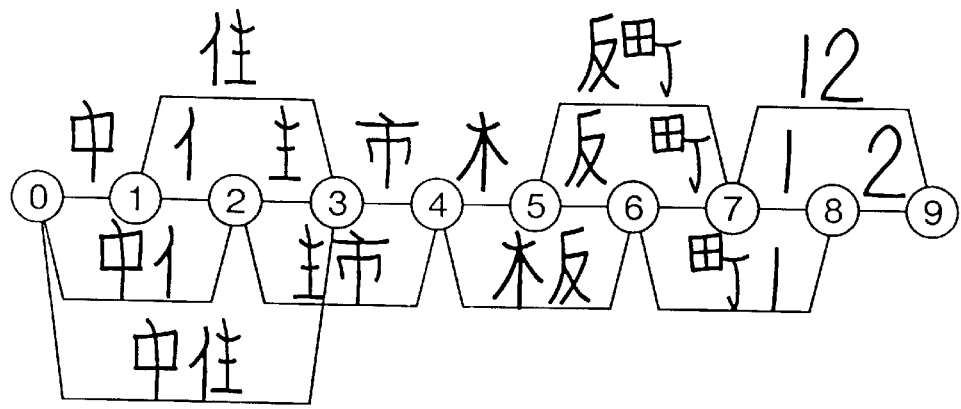
FIG. 34A and 34B are diagrams showing examples of the segmentation hypothesis network and assumed segmentation errors.
Figure 34B:
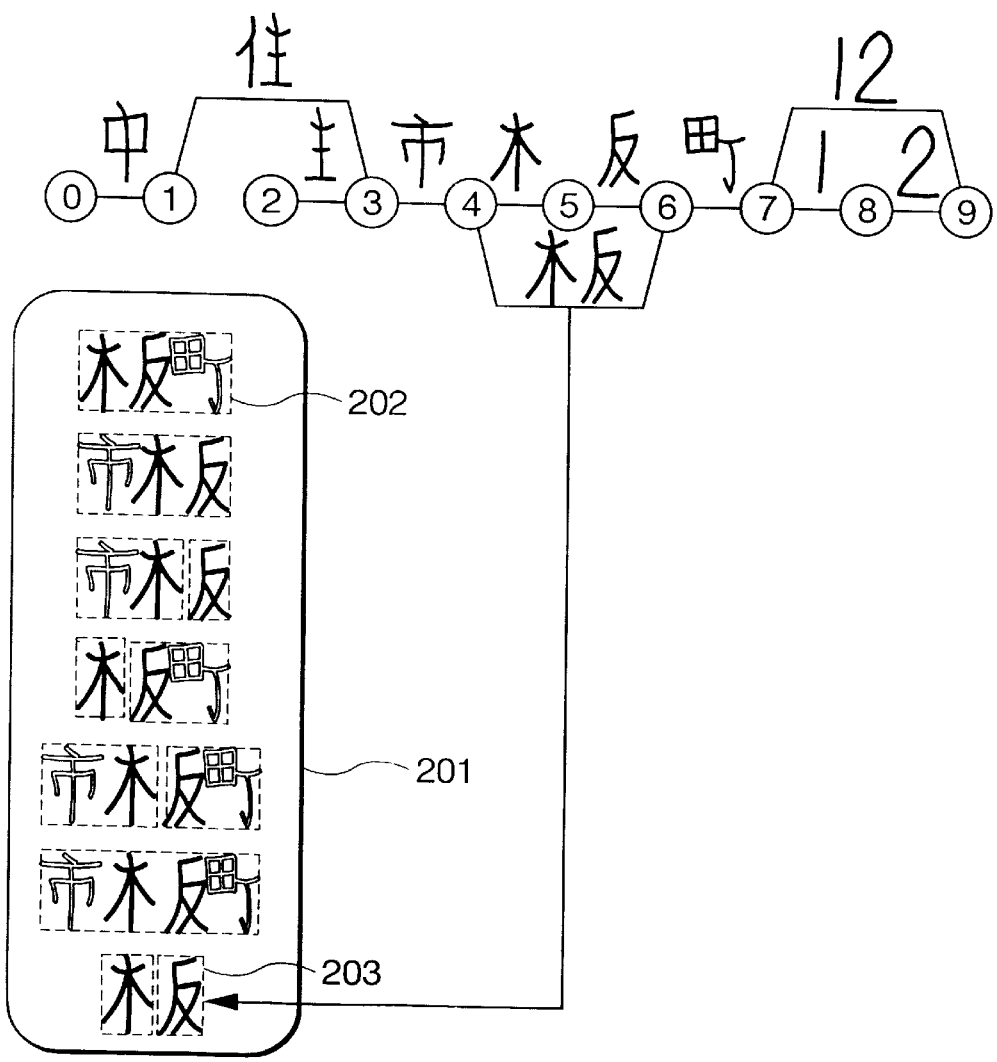

FIG. 27 is a flowchart of the address dictionary matching process 176. The process receives the inputs of a tentative character pattern, pattern credibility candidate character and similarity from the pattern table and boundary table explained previously. Initially, the tentative character pattern selection process 2701 selects tentative character patterns having values of pattern credibility smaller than a certain value. In the example of FIG. 34A, the character patterns ⓪–②, ⓪–③, etc. have small values of similarity as a result of character classification and, consequently, have small values of pattern credibility. Therefore, these character patterns are removed, and the segmentation hypothesis network is reduced as shown in FIG. 34B. The character pattern 4–6 has a large external form penalty and thus has a small pattern credibility, and therefore it is removed.

Subsequently, the dictionary matching process 2703 compares candidate characters of each tentative character pattern resulting from character classification with address character strings stored in advance in the address dictionary 2704, and delivers matched address character strings as candidate character strings. The candidate address character string sorting process 2705 rearranges the candidate character strings in the descending order of the degree of matching between candidate characters and candidate character strings. A candidate character string having a greater degree of matching is inferred to be more credible.

Figure 28:
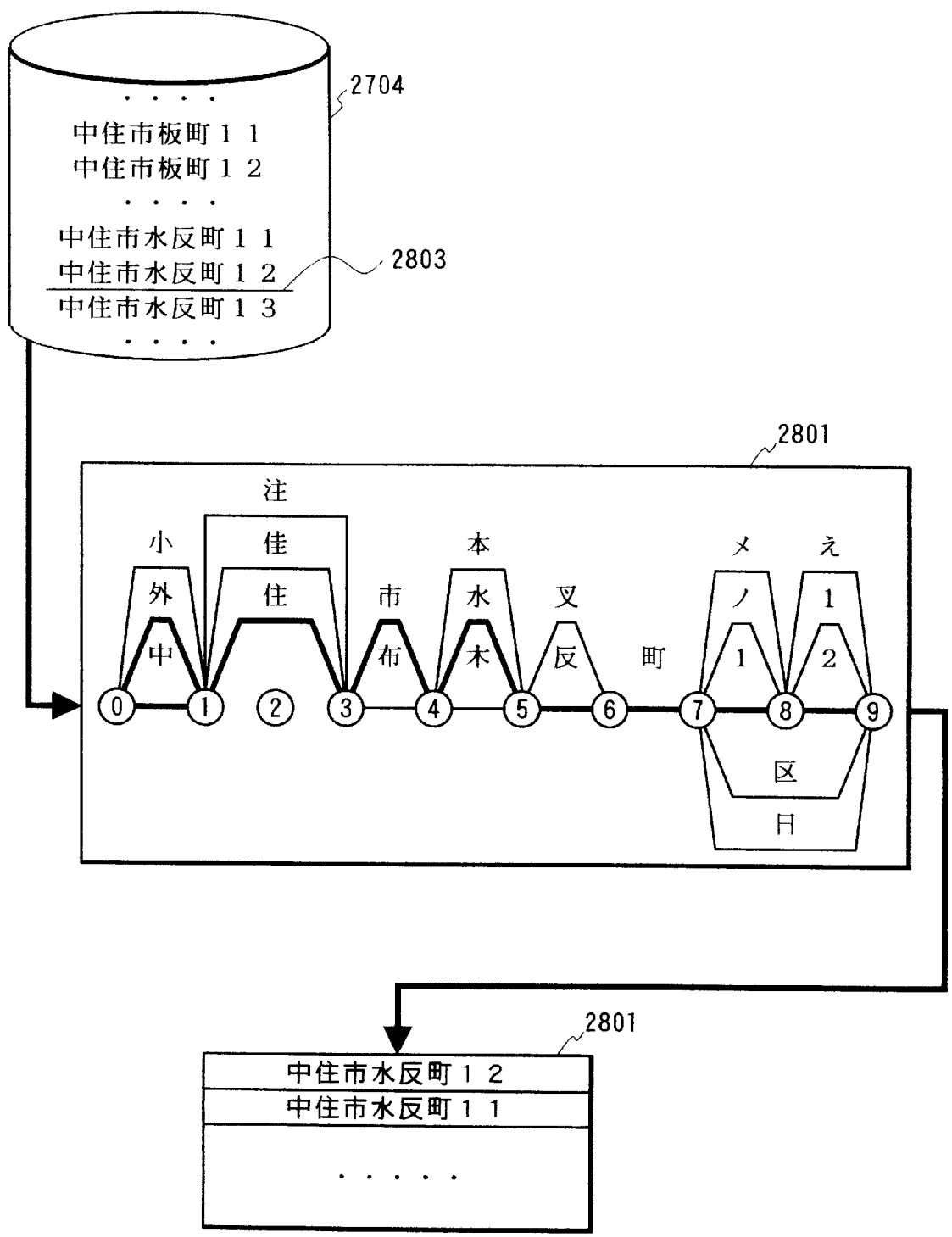
FIG. 28 is a diagram showing the principle of the dictionary matching process.

FIG. 28 shows in brief the dictionary matching process 2703. This process selects from the address dictionary 2704 an address character string which is accepted by the automaton created based on the result of character classification. For the determination of the address character string accepted by the automaton, the method proposed by Marukawa, et al. (The Transaction of the Institute of Information Engineers, Vol.35, No.6 "Chinese character address recognition: error correction algorithm") is adopted. In FIG. 28, a frame 2801 shows by model the automaton which is created by the candidate characters resulting from character classification following the selection of tentative character patterns. The boundary between patterns represents the state and a candidate character resulting from character classification represents the transition. Each state is numbered consistently with the node number of segmentation hypothesis network. The automaton is accomplished by means of a table having the same structure as the pattern table. The bold lines in the automaton 2801 indicate the route of acceptance of the character string 2803 (中住市水反町1 2) in the address dictionary 2704 by the automaton 2801. In case the automaton 2801 accepts a character string in the address dictionary 2704, it delivers the character string as a candidate character string. The matching credibility mc is the total of the values of credibility tc (transition credibility) of the events of transition at the matching process, as follows.

$$mc=\Sigma Stc$$

The transition credibility is evaluated as follows.

$$tc=\{c1 \cdot sm - c2 \cdot p\} \cdot jm$$

where sm is the similarity of the candidate character with respect to each transition, and jm is the difference of state numbers before and after the transition.

The constants c1 and c2 are the same ones used for evaluating the pattern credibility. In the example of FIG. 28, another character string "中住市水反町1 1" is also accepted, and it is delivered as an address recognition result 2802, although this character string is accepted based on the candidate character having a smaller similarity than the case of the former character string and therefore it has the smaller matching credibility.

Figure 29:
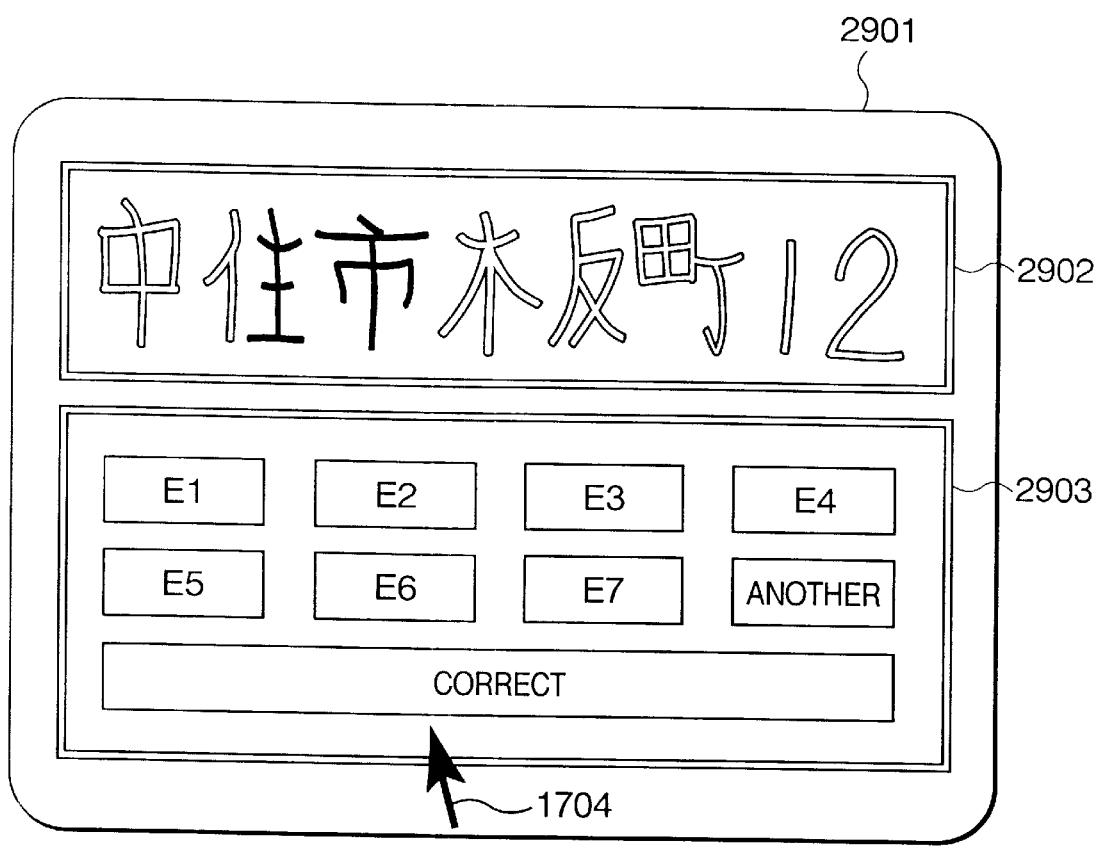
FIG. 29 is a diagram showing an example of display on the screen for the sample collecting tools.

FIG. 29 shows an example of display of the sample collection tool which is used to collect samples for the learning of the parameter dictionary 2404 which is used for the erroneous segmentation assessment process 2401 shown in FIG. 24. In the figure, indicated by 2901 is a CRT screen, and 2902 is a window for displaying the image of character string. In the character string displayed in the window, a character pattern in attention currently is displayed in a different color (shown by the solid image in the figure). The operator who watches the image in the window 2902 makes a judgment as to whether the pattern is segmented correctly or not. On finding the incorrect segmentation, the operator identifies the type of erroneous segmentation shown in FIG. 23, and points the respective key displayed on the panel 2903 with the cursor 2904. In response to the operater's key action, the sample collection tool stores the feature values of the pattern in attention in the file of the error type and displays another character pattern in the window 2902.

Figure 30:
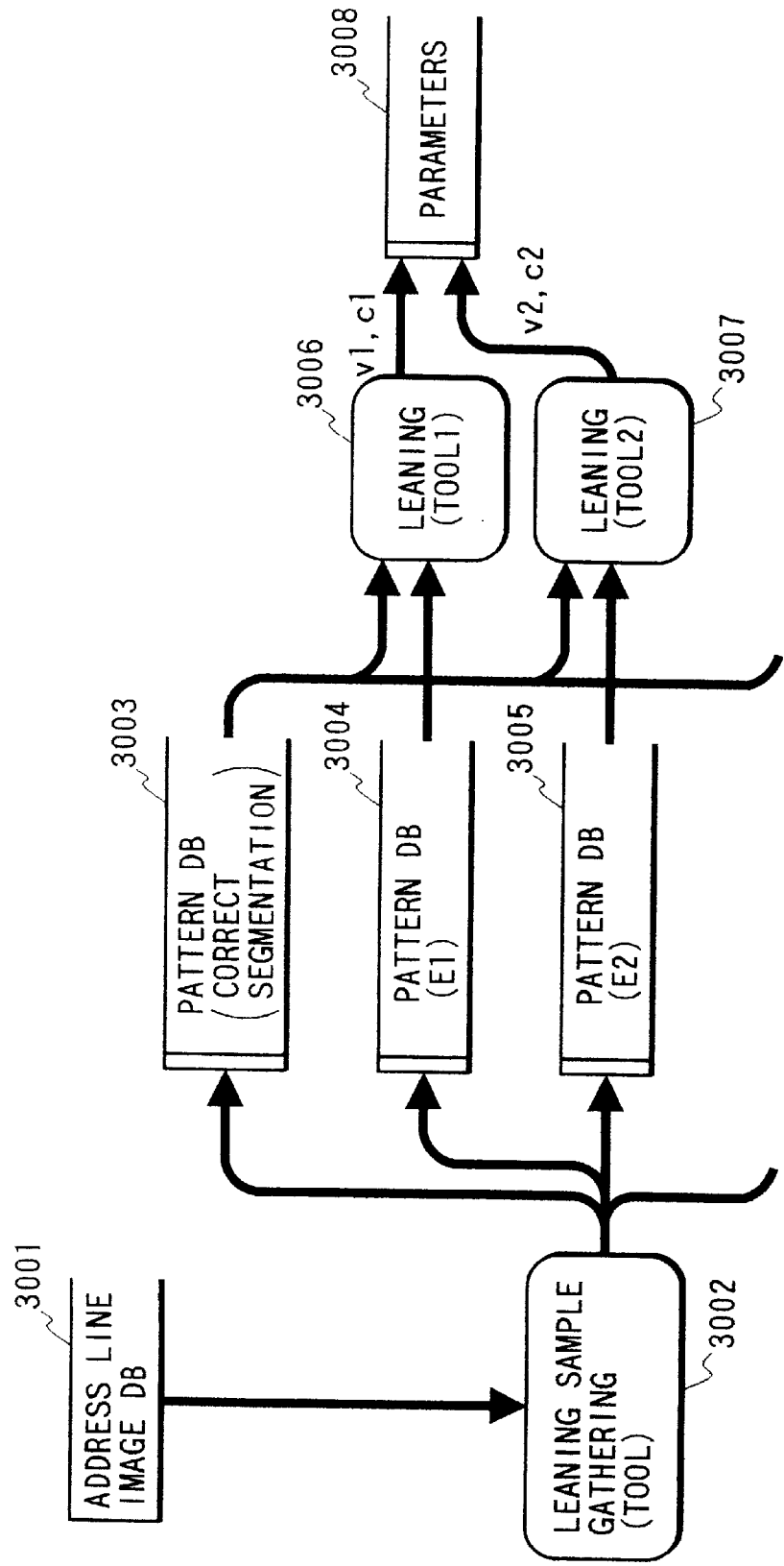
FIG. 30 is a flowchart showing the learning of the parameter dictionary.

FIG. 30 is a flowchart of the process for the learning of the parameter dictionary 2404 in FIG. 24. The sample collection tool 3002 uses address line image database (DB) 3001 collected in advance to produce correct segmentation pattern database 3003 and incorrect segmentation pattern databases (3004,3005, etc.) corresponding to the pattern databases E1 through E7 of the assumption of incorrect segmentation of FIG. 23. The learning tool 3006, which receives data of the correct segmentation pattern database 3003 and incorrect segmentation pattern database 3004 of E1, evaluates the weight vector V1 and constant c1 in the manner explained in connection with FIG. 26 and delivers these values to the parameter dictionary 3008. Similarly, the process uses other learning tools (3007, etc.) to evaluate weight vectors Vi and constants ci for the incorrect segmentation pattern databases (3005, etc.), and delivers these values to the parameter dictionary 3008.

Figure 31:
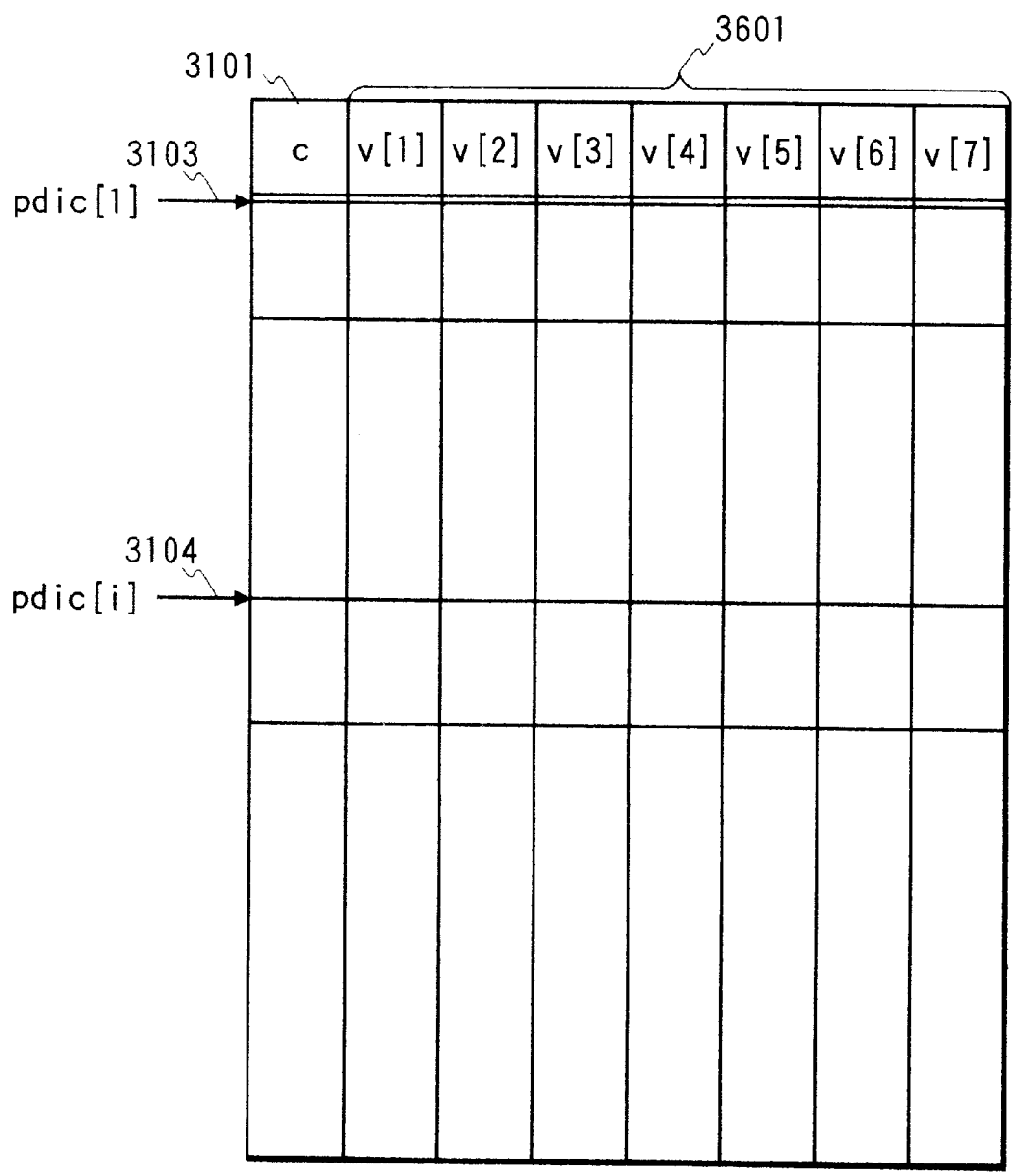
FIG. 31 is a table showing the structure of the parameter dictionary.

FIG. 31 shows the table structure of the parameter dictionary. Each record pdic[i] of the table contains parameters Vi and ci corresponding to Ei. For example, the first record pdic[1] 3103 of the table contains V1 and c1, and the i-th record 3104 counted from the top contains Vi and ci. The parameters ci and Vi are stored in fields 3101 and 3102, respectively, of each record.

FIG. 32 shows the sequence of the external form penalty calculation process. The first step 3201 initializes the variable p to 0. The subsequent steps 3203 and 3204 are repeated while incrementing the variable i in the control loop 3202. The step 3203 starts the erroneous segmentation assessment process, and the step 3204 adds the results pi of erroneous segmentation assessment to p. Step 3208 delivers the variable p as the external form penalty. Steps 3205 and 3206 are the subroutine of erroneous segmentation assessment. The step 3205 substitutes the value of (pdic$_i$.c) of ci, which has been read out of the parameter dictionary, to the variable pi. The step 3206 is a control loop for evaluating the inner product of the F resulting from feature extraction and Vi read out of the parameter dictionary. Specifically, products of the values of (pdic$_i$.v$_j$) of Vi and values of F (f$_j$) are added to pi while incrementing the variable j up to the number of order of the feature.

We claim:

1. A method of reading characters by converting image information of a written surface into an electrical signal and reading characters of a character string included in the image information, said method comprising:
   a first step of locating a character string description region in the electrical signal of the image information, and segmenting image information of a character string in the character string region into multiple tentative character patterns;
   a second step of implementing the character classification for the tentative character patterns by making reference to a character classification dictionary thereby to obtain multiple recognition candidate characters for each tentative character pattern;
   a third step of obtaining border information for the tentative character patterns;
   a fourth step of obtaining the credibility of the border information of the tentative character patterns obtained in said third step by making reference to a segmentation dictionary which contains the border information by using the recognition-candidate characters obtained in said second step as the key, and applying weights to the tentative character patterns;
   a fifth step of determining the character segmentation in accordance with the weights of tentative character patterns; and
   a sixth step of implementing the word-wise matching by using the character classification dictionary based on a set of classified character species produced from the tentative character patterns determined in the fifth step, and identifying the characters of the character string.

2. A character reading method according to claim 1, wherein said periphery information of the tentative character patterns includes at least one of the vertical length, horizontal length, vertical/horizontal length ratio, pattern spacing and number of connected components of the character pattern, and wherein said segmentation dictionary contains information of likelihood distribution for at least one of the vertical length, horizontal length, vertical/horizontal length ratio, pattern spacing and number of connected components of each character, and wherein said reference key of the segmentation dictionary in said fourth step is the character species of candidate characters resulting from character classification.

3. A character reading method according to claim 1, wherein said fourth step includes a step of creating and revising the segmentation dictionary, said creation/revision step including a step of displaying on the screen of a display device the input image of a character string to be recognized, the tentative character patterns, and candidate characters resulting from character classification for the tentative character patterns, a step of revising the segmentation dictionary by using the display on the screen of the display device, and a step of displaying the state of character string recognition process graphically on the screen.

4. A method of reading a postal address comprising:
   a first step of converting image information, which includes character string information having a town name portion and a street number portion, into an electrical signal;
   a second step of locating a character string description region in the electrical signal of the image information, and extracting combinations of connected image components, which form characters in the character string description region, as tentative character patterns;
   a third step of implementing the character classification for each of the tentative character patterns by making reference to the character classification dictionary thereby to obtain recognition candidate characters and the similarity of tentative character patterns and the recognition-candidate characters;
   a fourth step of forming a lattice consisting of the recognition-candidate characters, implementing the matching for the lattice with a town name dictionary thereby to identify character strings of the town name portion in the tentative character patterns, and detecting the head position of the street number portion;
   a fifth step of extracting, based on the information of the head position obtained in said fourth step, periphery information of tentative character patterns which correspond to recognition-candidate characters of tentative character patterns in the street number portion, and applying weights to the tentative character patterns for evaluating the credibility of the periphery information of the tentative character patterns by making reference to the segmentation dictionary, which contains likelihood of the periphery information, by using the recognition-candidate character as the key;
   a sixth step of segmenting the street number portion into characters based on the weights; and
   a seventh step of implementing the word-wise matching with a street number dictionary for a set of character classification results produced in said sixth step thereby to identify the character string of street number.

5. A postal address reading method according to claim 4, wherein said second step includes a step of extracting characters from the top and end of the extracted character string, and discriminating the vertical writing form or horizontal writing form based on the classification of the extracted character patterns.

6. A postal address reading method according to claim 4, wherein said pattern periphery information includes at least one of the vertical length, horizontal length, vertical/horizontal length ratio, pattern spacing and number of connected components of character pattern, and wherein said segmentation dictionary contains information of likelihood distribution for at least one of the vertical length, horizontal length, vertical/horizontal length ratio, pattern spacing and number of connected components of each character, and wherein said reference key of recognition-candidate character in said fifth step is characters in the segmentation dictionary.

7. A postal address reading method according to claim 4, wherein said fifth step includes a step of creating and revising the segmentation dictionary, said creation/revision step including a step of displaying on the screen of a display device the input image of an address character string to be recognized, said character patterns and candidate characters resulting from character classification for the character patterns, a step of revising the segmentation dictionary by using the display on the screen of the display device, and a step of displaying the state of address character string recognition process graphically on the screen.

8. A method of reading characters with a postal address reading apparatus having an image input means for converting image information of a written surface into an electrical signal and means of reading out of the image a character string written on the surface, said method comprising:

a first step of extracting the signal of the character string from the electrical signal of the image;

a second step of extracting a tentative character pattern which is deemed to form a character from the signal of the character string, or, in case a tentative character pattern cannot be determined uniquely, extracting a plurality of tentative character patterns;

a third step of implementing the character classification for the extracted tentative character pattern;

a fourth step of calculating the external form penalty based on the assessment of the periphery information depending on the possible types of error of character segmentation; and a fifth step of confining candidates of tentative character patterns in accordance with the character classification result of said step 3 and the external form penalty calculated in said fourth step, and implementing the matching for the character pattern candidates with character strings stored in advance in a dictionary which contains character strings that can possibly be written on written surfaces, thereby recognizing the character string written on the written surface.

9. A character reading method according to claim 8, wherein said character string written on the written surface is a character string which signifies a postal address, and said dictionary which contains character strings that can possibly be written on written surfaces comprises a dictionary in which postal addresses are described.

10. A character reading method according to claim 8, wherein said fourth step uses discriminant functions which distinguish a tentative character pattern segmented correctly and a tentative pattern segmented erroneously.

11. A character reading method according to claim 10, wherein one of said discriminant functions treats as one of feature values the spacings of each tentative character pattern with the neighboring patterns.

12. A character reading method according to claim 10, wherein one of said discriminant functions treats the gap in each pattern.

13. A character reading method according to claim 10, wherein said discriminant functions of said fourth step are created by the method which comprises:

a step of extracting a tentative character pattern which is deemed to form a character string from the image of the character string, or, in case a tentative character pattern cannot be determined uniquely, extracting a plurality of tentative character patterns;

a step of entering information on as to whether or not the tentative character pattern is segmented correctly, with types of segmentation error being sorted manually in the case of incorrect segmentation;

a step of storing tentative character patterns in a memory by sorting the tentative character patterns depending on the result of said incorrect segmentation judgment step; and a step of implementing the learning of a classifying device by using the tentative character patterns stored in the memory by said pattern storing step.

\* \* \* \* \*